(12) United States Patent
Arimitsu et al.

(10) Patent No.: US 11,290,031 B2
(45) Date of Patent: Mar. 29, 2022

(54) VIBRATION-TYPE ACTUATOR WITH VIBRATION BODY AND CONTACT BODY RELATIVELY MOVING, APPARATUS, MULTI-AXIS STAGE UNIT, AND ARTICULATED ROBOT

(71) Applicant: CANON KABUSHIKI KAISHA, Tokyo (JP)

(72) Inventors: Yasumichi Arimitsu, Yokohama (JP); Kosuke Fujimoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 107 days.

(21) Appl. No.: 16/884,172

(22) Filed: May 27, 2020

(65) Prior Publication Data

US 2020/0382024 A1 Dec. 3, 2020

(30) Foreign Application Priority Data

May 31, 2019 (JP) .............................. JP2019-102981

(51) Int. Cl.
*H02N 2/02* (2006.01)
*H02N 2/00* (2006.01)
(52) U.S. Cl.
CPC ........... *H02N 2/028* (2013.01); *H02N 2/0055* (2013.01); *H02N 2/026* (2013.01)
(58) Field of Classification Search
CPC ....... H02N 2/028; H02N 2/026; H02N 2/0055
See application file for complete search history.

(56) References Cited

U.S. PATENT DOCUMENTS 10,958,193 B2 * 3/2021 Arakawa .................... B25J 9/12
2018/0242820 A1 8/2018 Tanaka

FOREIGN PATENT DOCUMENTS

JP 63-316675 A 12/1988
JP 2018-140101 A 9/2018

OTHER PUBLICATIONS

U.S. Appl. No. 16/904,694, Yasumichi Arimitsu Kosuke Fujimoto, filed Jun. 18, 2020.

* cited by examiner

*Primary Examiner* — Emily P Pham
(74) *Attorney, Agent, or Firm* — Venable LLP

(57) ABSTRACT

A vibration-type actuator that can suppress variation in pressing force and reaction force on vibration bodies and contact bodies includes vibration body units, each including a vibration body including an elastic body and an electromechanical energy conversion element, and a contact body contacting with the vibration bodies, with the contact body and the vibration bodies moving relatively in a predetermined direction. A first vibration body unit, from among the vibration body units, includes a restriction unit configured to fix the first vibration body unit and restrict a degree of freedom in the predetermined direction, and a second vibration body unit, from among the vibration body units, includes a supporting guide unit configured to support the second vibration body unit while the second vibration body unit is movable in a direction orthogonal to the predetermined direction.

20 Claims, 23 Drawing Sheets

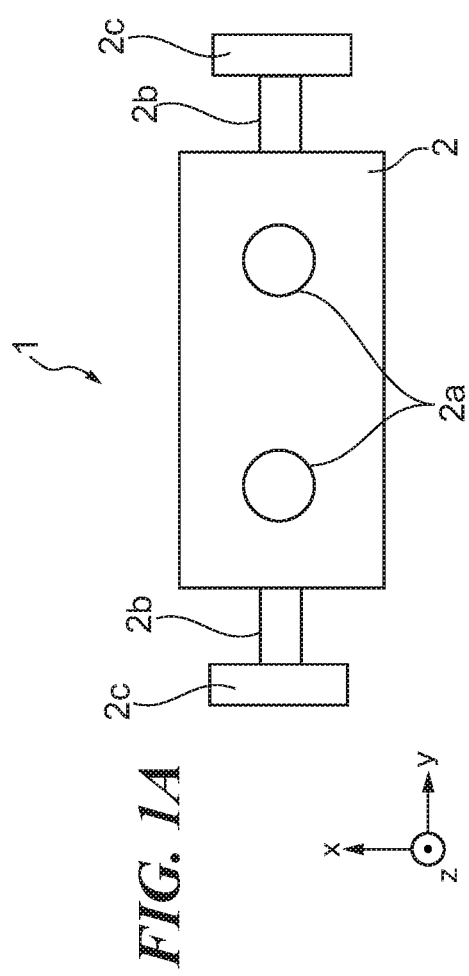
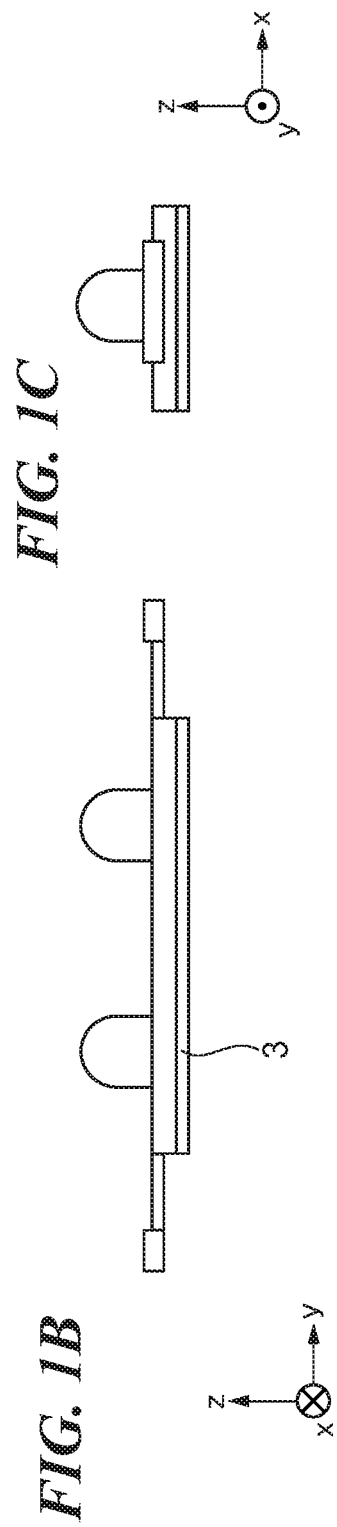
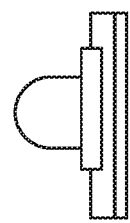
FIG. 1A
FIG. 1B
FIG. 1C

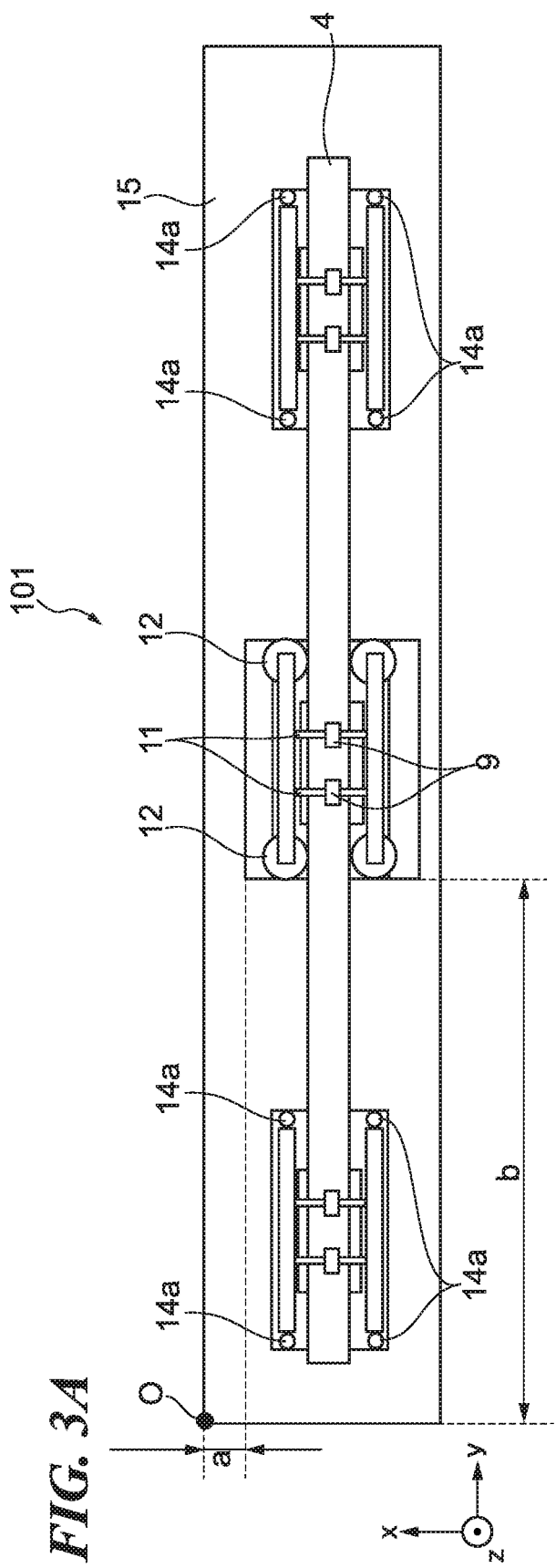
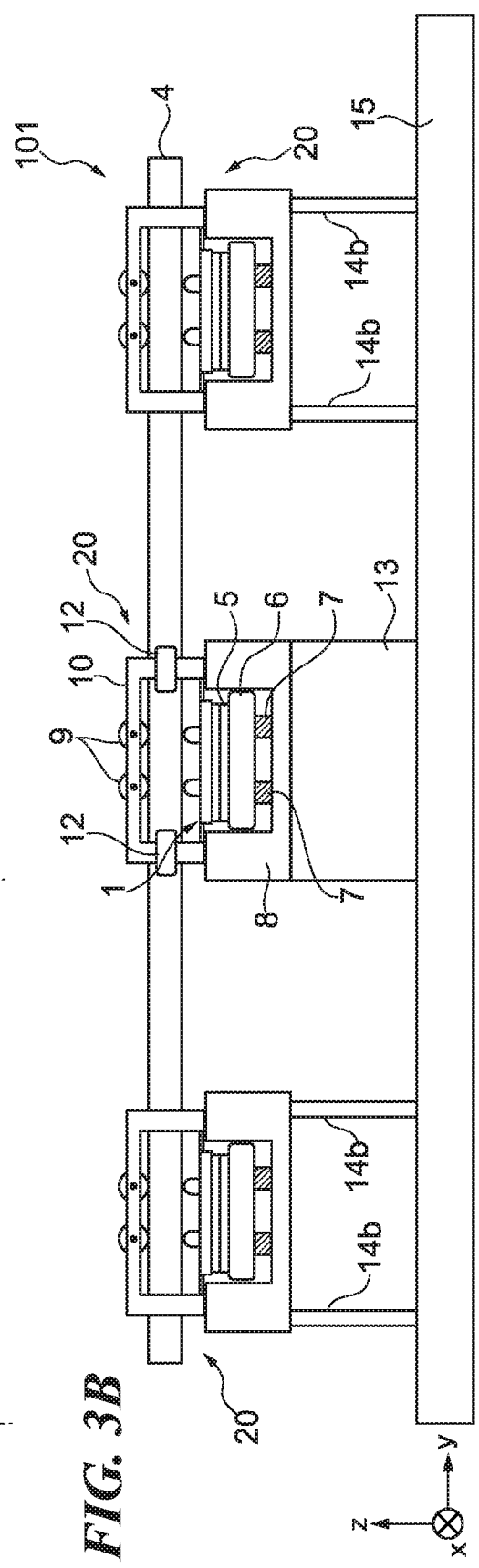

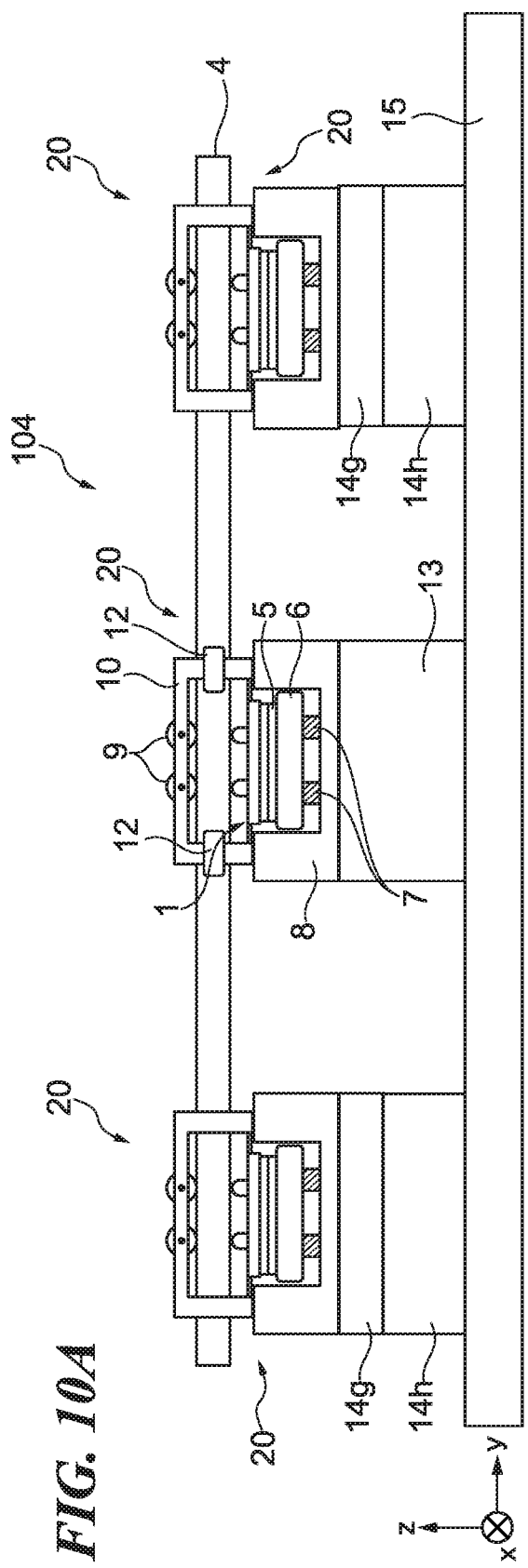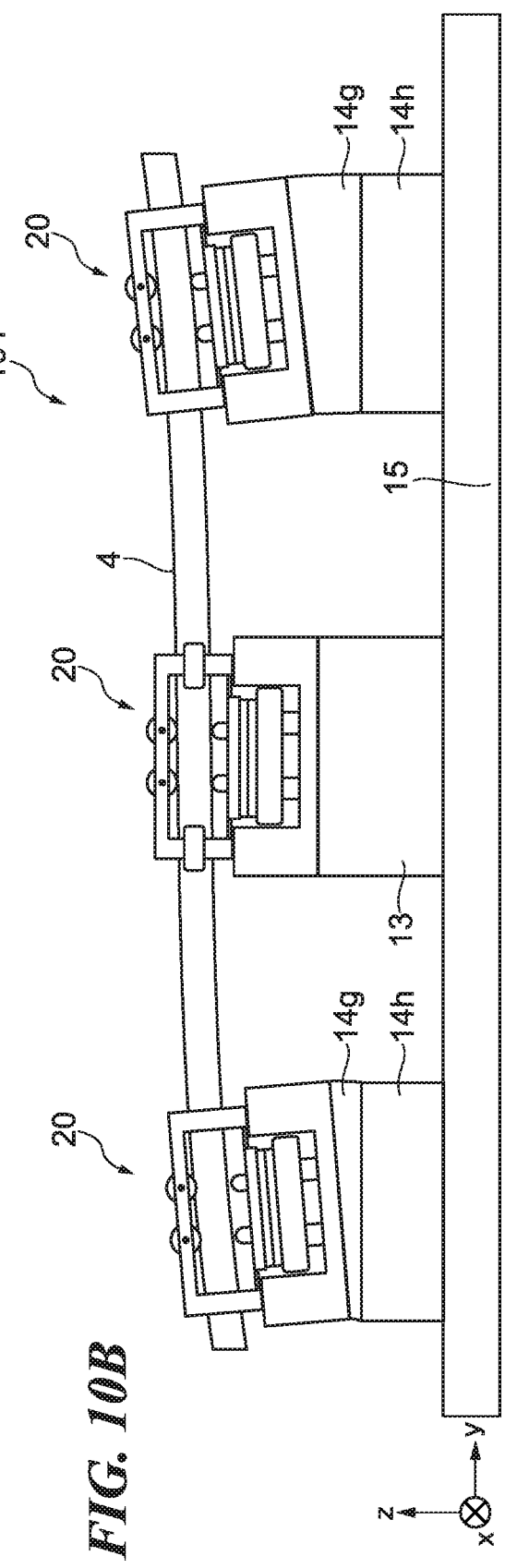

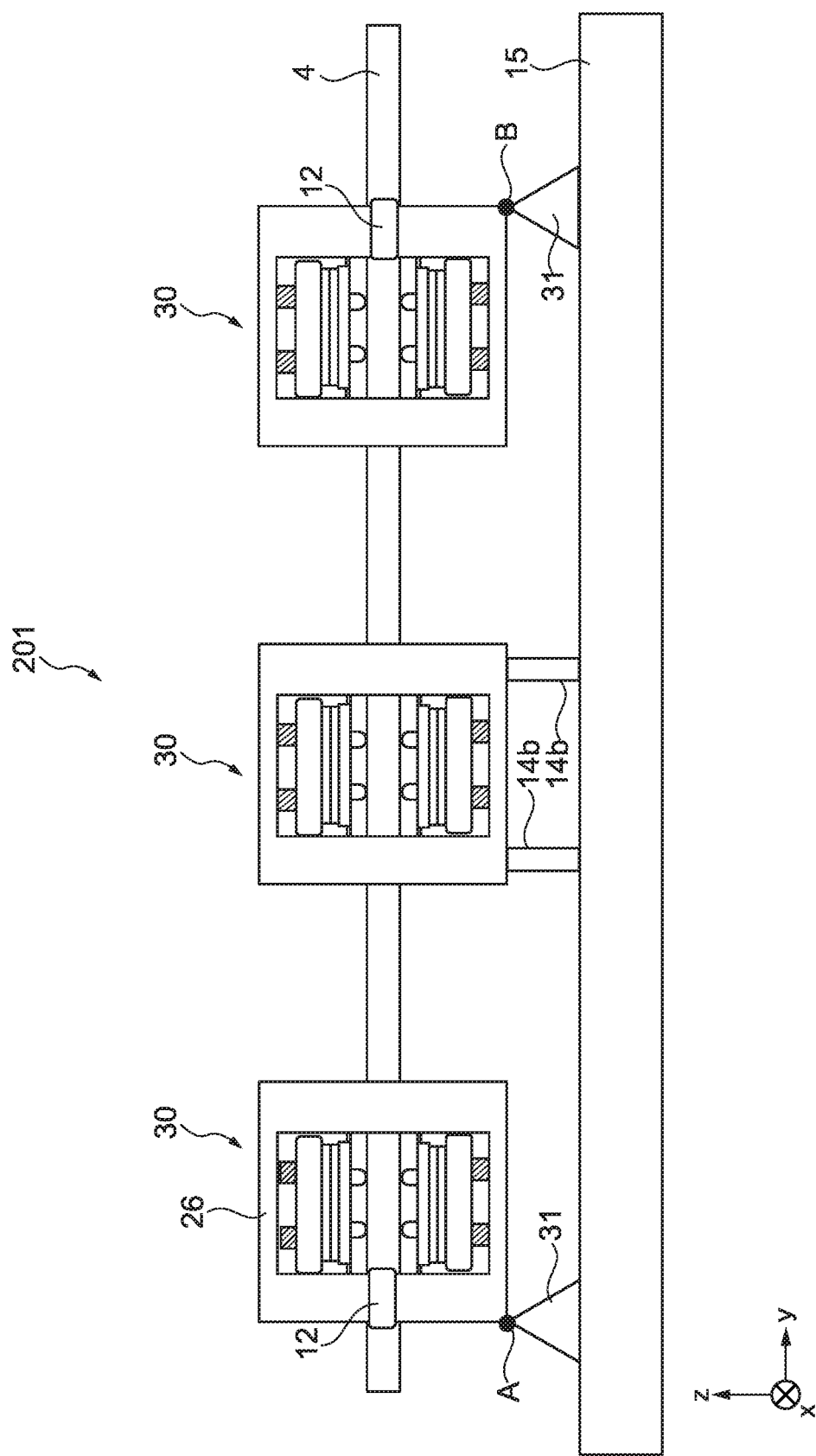

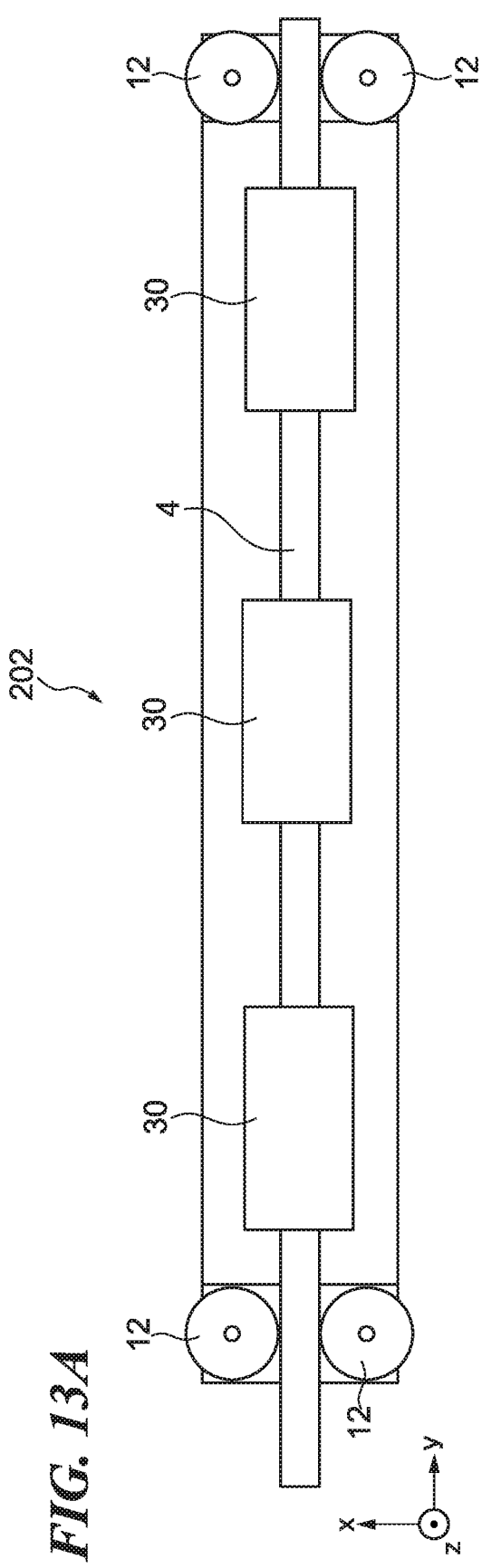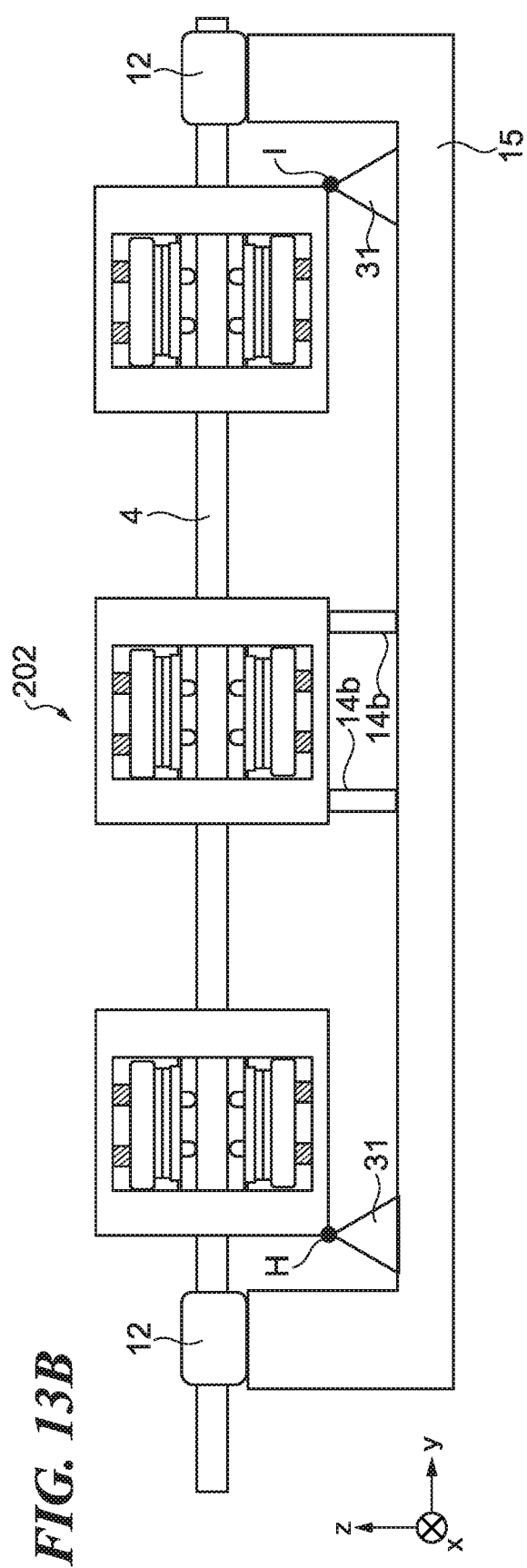

VIBRATION-TYPE ACTUATOR WITH VIBRATION BODY AND CONTACT BODY RELATIVELY MOVING, APPARATUS, MULTI-AXIS STAGE UNIT, AND ARTICULATED ROBOT

BACKGROUND OF THE INVENTION

Field of the Invention

The present invention relates to a vibration-type actuator with a vibration body and a contact body relatively moving, an apparatus, a multi-axis stage unit, and an articulated robot.

Description of the Related Art

There have been proposed a vibration-type actuator that generates vibration with different vibration modes combined to obtain thrust between a vibration body and a contact body, and a vibration-type actuator that implements excitation in a single vibration mode to change frictional force between a vibration body and a contact body.

In the above-described vibration-type actuator, it has been proposed to provide a plurality of vibration bodies for purposes such as increasing the thrust and the torque, improving the degree of freedom in design, and achieving diversification of risk of failure. For example, Japanese Laid-Open Patent Publication (kokai) No. S63-316675 discloses arranging a plurality of piezoelectric vibration bodies in series and moving a common moving body (a contact body in the present specification) in a predetermined direction.

In the configuration in which the vibration-type actuator has a plurality of vibration bodies as in the technology disclosed in Japanese Laid-Open Patent Publication (kokai) No. S63-316675, the size of the contact body in the longitudinal direction (moving direction) increases in accordance with the shape of the vibration-type actuator. As a result, the shape of the contact body in the moving direction is difficult to accurately form and maintain, and the contact body is likely to be deformed.

Deformation of the contact body leads to a variation in the pressing force for pressing the vibration body against the contact body between the vibration bodies. The same applies to the reaction force produced by the pressing force. A vibration body involving relatively small pressing force and reaction force results in frictional force between the vibration body and the contact body being relatively reduced. Thus, the thrust and the torque may be reduced. On the other hand, a vibration body involving relatively large pressing force and reaction force results in the frictional force between the vibration body and the contact body being relatively large. Thus, the frictional force may overwhelm a design allowable range. Thus, abnormal wearing may occur, or components in the vibration body unit may be deformed or damaged.

SUMMARY OF THE INVENTION

The present invention provides a vibration-type actuator, an apparatus, a multi-axis stage unit, and an articulated robot that can suppress variation in pressing force and reaction force on vibration bodies and contact bodies.

Accordingly, one embodiment of the present invention provides a vibration-type actuator comprising: a plurality of vibration body units each including a vibration body including an elastic body and an electro-mechanical energy conversion element; and a contact body configured to come into contact with a plurality of the vibration bodies, wherein the contact body and the plurality of the vibration bodies relatively move in a predetermined direction, a first vibration body unit, which includes at least one of the vibration body units, includes a restriction unit configured to fix the first vibration body unit and restrict a degree of freedom in the predetermined direction, and a second vibration body unit, which includes at least one of the vibration body units, includes a supporting guide unit configured to support the second vibration body unit while the second vibration body unit being movable in a direction orthogonal to the predetermined direction.

According to the present invention, in a vibration-type actuator having a plurality of vibration body units, it is possible to suppress variation in pressing force and reaction force on vibration bodies and contact bodies.

Further features of the present invention will become apparent from the following description of exemplary embodiments with reference to the attached drawings.

BRIEF DESCRIPTION OF THE DRAWINGS

FIGS. 1A to 1C are schematic diagrams schematically showing a vibration body according to a first embodiment of the present invention.

FIGS. 3A and 3B are schematic diagrams schematically showing an overall configuration of a vibration-type actuator according to the first embodiment of the present invention.

FIGS. 10A and 10B are schematic diagrams schematically showing another vibration-type actuator according to the first embodiment of the present invention.

FIG. 12 is a schematic front view of a vibration-type actuator according to a second embodiment of the present invention.

FIGS. 13A and 13B are schematic diagrams schematically showing another vibration-type actuator according to the second embodiment of the present invention.

DESCRIPTION OF THE EMBODIMENTS

Figure 2A:
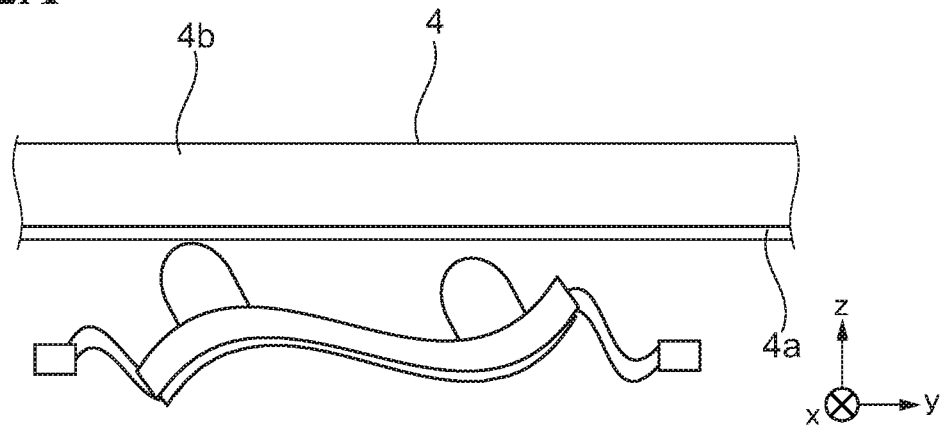
FIGS. 2A to 2C are explanatory diagrams showing two vibration modes excited in the vibration body according to the first embodiment of the present invention.

Hereinafter, embodiments of the present invention will be described in detail with reference to the accompanying drawings. Each embodiment described below is merely an example of a configuration capable of implementing the present invention. Each embodiment described below can be appropriately modified or changed according to the configuration of the apparatus to which the present invention is applied and various conditions. Therefore, the scope of the present invention is not limited by the configurations described in the following embodiments. For example, a configuration in which a plurality of configurations described in the embodiments are combined may be implemented as long as there is no contradiction between the configurations. A vibration-type actuator including a plurality of vibration body units according to the following embodiments is applicable to various apparatuses including a multi-axis stage and an articulated robot described later.

A vibration-type actuator according to a first embodiment of the present invention will be described with reference to FIGS. 1A to 11D. It should be noted that common coordinate axes (x axis, y axis, z axis) are shown in FIGS. 1A to 11D related to the first embodiment.

FIGS. 1A to 1C are schematic diagrams schematically showing a vibration body 1 of a vibration-type actuator 101. FIGS. 1A, 1B, and 1C are respectively a schematic plan view, a schematic front view, and a schematic right side view, based on the third angle projection. The vibration body 1 includes an elastic body 2 having elasticity, and an electro-mechanical energy conversion element 3 joined to the elastic body 2.

The electro-mechanical energy conversion element 3 includes, for example, a piezoelectric element capable of converting voltage into force based on a piezoelectric effect.

The electro-mechanical energy conversion element 3 has a plurality of electrodes each capable of being applied corresponding voltage. The elastic body 2 has protrusions 2a, hangers 2b, and support ends 2c. The protrusions 2a are protruding members that protrude in the z-axis direction orthogonal to the xy directions in which the elastic body 2 extends. The support ends 2c are rectangular parallelepiped members with which the vibration body 1 is fixed and supported by a holding unit 8 described later. The hangers 2b are bridge-shaped members that connect the elastic body 2 and the support ends 2c to each other. The vibration body 1 is pressed against a contact body 4 with an appropriate pressing force applied by a pressing unit via the two protrusions 2a.

Figure 2B:
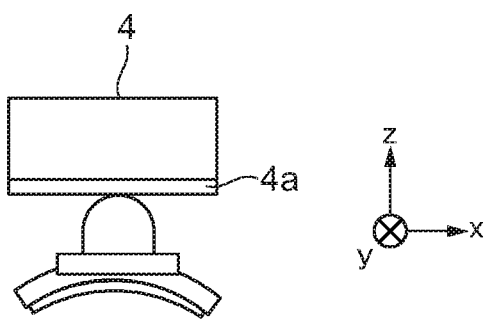
Figure 2C:
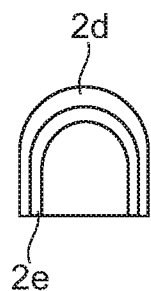

With reference to FIGS. 2A to 2C, two vibration modes (vibration forms) excited in the vibration body 1 according to the first embodiment of the present invention will be described. When a plurality of alternating voltages with different phases are applied to the electrodes of the electro-mechanical energy conversion element 3, vibrations in two out-of-plane bending modes as shown in FIGS. 2A and 2B are excited.

FIG. 2A shows a secondary out-of-plane bending vibration mode involving generation of three nodal lines, parallel to the x-axis direction, in a rectangular portion which is a portion of the vibration body 1 excluding the protrusions 2a and the hangers 2b. The vibration in the secondary out-of-plane bending vibration mode described above excites vibration involving displacement in a direction (y-axis direction) parallel to a surface to be in contact with the contact body 4, at the tips of the two protrusions 2a.

On the other hand, FIG. 2B shows a primary out-of-plane bending vibration mode involving generation of two nodal lines parallel to the y-axis direction, which is the longitudinal direction of the vibration body 1. The vibration in the primary out-of-plane bending vibration mode described above excites a vibration involving displacement in a direction (z-axis direction) orthogonal to a surface to be in contact with the contact body 4, at the tips of the two protrusions 2a.

By combining the above-described excited vibrations in the two vibration modes, an elliptical motion in the xy plane is generated on the upper surfaces of the two protrusions 2a, and a frictional force for relatively moving the contact body 4 in the y-axis direction is generated. It should be noted that instead of the above-described vibration body 1, a vibration body 1 that excites vibration in another vibration mode as disclosed in Japanese Laid-Open Patent Publication No. S63-316675 may be employed.

Furthermore, instead of the elliptical motion by the protrusions 2a, only the vibration mode involving displacement in the direction orthogonal to the contact plane shown in FIG. 2B may be excited, and the vibration amplitude of the vibration in the above-vibration mode may be controlled to change the frictional force acting between protrusions 2a and the contact body 4. In a state where no voltage is applied to the electro-mechanical energy conversion element 3, the static frictional force between the protrusions 2a and the contact body 4 serves as holding force. When voltage is applied to the electro-mechanical energy conversion element 3, the vibration amplitude changes. Thus, the contact time between the protrusions 2a and the contact body 4 changes, so that apparent frictional force can be changed. The above configuration enables a change in the reaction force involved in the displacement of the contact body 4 due to application of an external force. For example, operation reaction force received by the user when the user operates the contact body 4 by applying an external force can be changed.

Next, materials for forming the vibration body 1 and the contact body 4 will be described. The elastic body 2 of the vibration body 1 may be formed of a material with small vibration loss such as: martensitic stainless steel; toughening ceramics including partially stabilized zirconia (PSZ); engineering plastics including polyetheretherketone (PEEK-CF30) reinforced by approximately 30[wt %] of carbon fibers; a semiconductor such as silicon carbide (SiC); and aluminum alloy.

Furthermore, the electro-mechanical energy conversion element 3 of the vibration body 1 can be formed of piezoelectric ceramics such as lead titanate-lead zirconate (PbZrO3-PbTiO3). The contact body 4 may be formed of a material such as the above-described martensitic stainless steel, aluminum alloy, fiber-reinforced engineering plastic such as PEEK-CF30, or fine ceramic such as PSZ or aluminum oxide aluminum.

Preferably, as shown in FIGS. 2A to 2C, a friction material 2d is provided over the surface of the protrusion 2a, and a friction material 4a is provided over the surface of the contact body 4, so that stable frictional sliding characteristics can be achieved between the elastic body 2 and the contact body 4. FIG. 2C is a schematic cross-sectional view of the protrusion 2a. The friction material 2d is provided on the surface of a base material 2e of the protrusion 2a. When martensitic stainless steel is used for the base materials 2e and 4b, an electroless nickel plating film, a chrome plating film, a hardened layer obtained by quenching, a nitride film obtained by ion nitriding, or the like may be used for the friction materials 2d and 4a. Furthermore, a configuration may be adopted in which the fiber-reinforced engineering plastic such as PEEK-CF30 or hard ceramics is used for the base materials 2e and 4b, so that a single component serves as both the base material and the friction material.

An overall configuration of the vibration-type actuator 101 according to a first embodiment of the present invention will be described with reference to FIGS. 3A and 3B. FIG. 3A is a schematic plan view, and FIG. 3B is a schematic front view. The vibration-type actuator 101 includes three vibration body units 20 arranged in series in the y-axis direction (predetermined direction) in which the contact body 4 moves. One contact body 4 is moved by the three vibration body units 20 in the y-axis direction.

Each vibration body unit 20 includes the vibration body 1, a nonwoven fabric 5, a spacer 6, a pressing unit 7, the holding unit 8, reaction force receiving units 9, frames 10, and shafts 11. The support ends 2c of the vibration body 1 are fixed to the upper surfaces of the side walls of the holding unit 8. The nonwoven fabric 5, the spacer 6, and the pressing unit 7 are arranged in this order from the side of the vibration body 1, while being sandwiched between the electro-mechanical energy conversion element 3 joined to the back surface of the elastic body 2 and the bottom of the holding unit 8 holding the vibration body 1.

The pressing unit 7 is an element that presses the protrusion 2a of the vibration body 1 against the contact body 4 via the nonwoven fabric 5 and the spacer 6, and is formed of a spring element that exhibits restoring force in the z-axis direction. Examples of the spring element include a coil spring, a leaf spring, a disc spring, a wave washer, rubber, an air tube, and the like. The nonwoven fabric 5 is a cloth-like member formed of a material such as wool felt, and supports the vibration body 1 while maintaining the vibration mode generated in the vibration body 1. The spacer 6 achieves even distribution of the pressing force from the pressing unit 7, to suppress variation between the two protrusions 2a in the pressing force. The spacer 6 is slidable along the inner walls of the holding unit 8 in the z-axis direction, and can maintain the vibration body 1 to be substantially in parallel with the xy plane.

The reaction force receiving units 9 are provided on the opposite side (above in FIG. 3B) of the contact plane between the contact body 4 and the protrusions 2a, and receive reaction force against the pressing force for pressing the vibration body 1 (protrusions 2a) against the contact body 4. The reaction force receiving units 9 are rollers that are attached to the two respective shafts 11 provided on two frames 10 fixed to the holding unit 8, and are rotatable about central axes of the shafts 11 parallel to the x-axis.

As shown in FIGS. 3A and 3B, the holding unit 8 of the vibration body unit 20 positioned at the center, out of the three vibration body units 20, is fixed to a main body 15 by a restriction unit 13. The restriction unit 13 implements relative positioning of the center vibration body unit 20 with respect to the main body 15. More specifically, the restriction unit 13 positions the center vibration body unit 20 at a position shifted from a reference position point O of the main body 15 by a distance a toward the negative side in the x-axis direction (downward direction in FIG. 3A) and by a distance b toward the positive side in the y-axis direction (rightward direction in FIG. 3A). The above positioning is implemented by a positioning unit such as pins and keys. The frame 10 of the vibration body unit 20 positioned at the center is provided with four contact body supporting units 12 which are rollers respectively rotatable around axes parallel to the z-axis. With the four contact body supporting units 12, the degree of freedom of the contact body 4 in the x-axis direction (in-plane direction) is restricted. As understood from the above, the contact body 4 is accurately positioned on the main body 15 via the restriction unit 13, by the reaction force receiving units 9 and the contact body supporting units 12 of the central vibration body unit 20.

On the other hand, as shown in FIGS. 3A and 3B the holding units 8 of the respective vibration body units 20 positioned on both ends, out of the three vibration body units 20, are supported by corresponding supporting guide units 14 to be relatively slidable in the z-axis direction. More specifically, the supporting guide units 14, each of which is linear guide including hole 14a provided in the holding unit 8 and guide shaft 14b having one end fixed to the main body 15, support the holding units 8 of the vibration body units 20 positioned at both end portions, while enabling the holding unit 8 to slide in the z axis direction via the holes 14a and the guide shafts 14b.

The provision of the vibration body units 20 in the vibration-type actuator 101 to increase thrust and torque as in the present embodiment leads to the size of the contact body 4 in the moving direction (y-axis direction) being larger relative to the thickness (the size in the z-axis direction) and to the width (size in the x-axis direction). As a result, the shape of the contact body 4 in the moving direction is deflected or twisted in response to the processing of parts or the residual stress of the used material of the contact body 4. Thus, the contact body 4 is difficult to form with high accuracy.

If the thickness of the contact body 4 is reduced for downsizing, the above-described problem becomes more pronounced; that is, the contact body 4 becomes even more difficult to form with high accuracy. It should be easily considered that even if the shape of the contact body 4 can be processed with high accuracy, the shape of the contact body 4 changes (deflection and twisting in the longitudinal direction occurs) due to thermal treatment such as quenching, ion nitriding treatment, annealing treatment, and change over time.

That is, with the configuration in which the vibration-type actuator 101 is provided with the vibration body units 20, the deformation of the contact body 4 is difficult to avoid.

The deformation of the contact body 4 leads to a change in the relative positions of the vibration body units 20 and the contact body 4 in the pressing direction (z-axis direction), resulting in a difference between the vibration body units 20 in the pressing force for pressing the vibration body 1 against the contact body 4. The above change may be further increased by the movement of the contact body 4. In the vibration body 1 in which the pressing force has become relatively small, the frictional force with respect to the contact body 4 is reduced, and thus the thrust and the torque may be reduced. On the other hand, in the vibration body 1 in which the pressing force has become relatively large, contact pressure between the vibration body 1 and the contact body 4 may become excessively large to cause abnormal wear and to cause excessively large frictional force to deform or damage the hangers 2b that hold the vibration body 1.

However, in the present embodiment, some of the vibration body units 20 of the vibration-type actuator 101 are supported so as to be slidable in the z-axis direction (a direction orthogonal to the moving direction of the contact body 4), so that the occurrence of the problem described above can be prevented. This will be described more in detail below.

Figure 4:
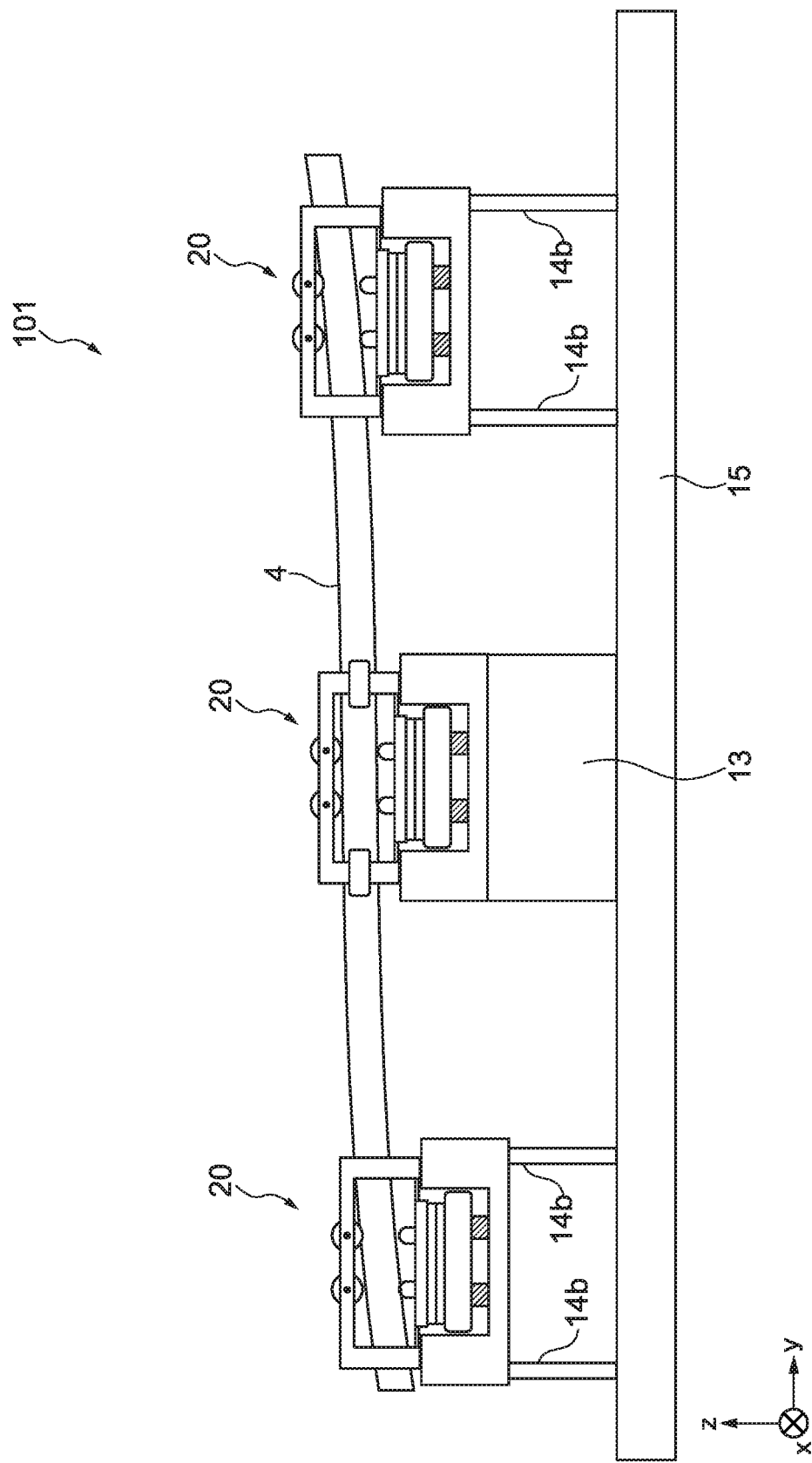
FIG. 4 is an explanatory diagram showing a behavior of the vibration-type actuator when a contact body is warped in the first embodiment of the present invention.

With reference to FIG. 4, the behavior of the vibration-type actuator 101 in a case where the contact body 4 is warped in a plane parallel to the yz plane will be described. As shown in FIG. 4, each of the vibration body units 20 at both ends follows (moves in the following manner) the warpage of the contact body 4 via the supporting guide unit 14 to move in the z-axis direction.

Even when deformation in the y-axis direction, such as deflection or twisting, of the contact body 4 occurs, the movement of the vibration body units 20 in the following manner in the z-axis direction can suppress the variation between the vibration body units 20 in the pressing force of the vibration body 1 against the contact body 4 and reaction force generated on the reaction force receiving unit 9. As a result, the vibration body units 20 can appropriately and efficiently generate thrust on the contact body 4, while preventing wearing and damage due to excessive force.

Figure 5A:
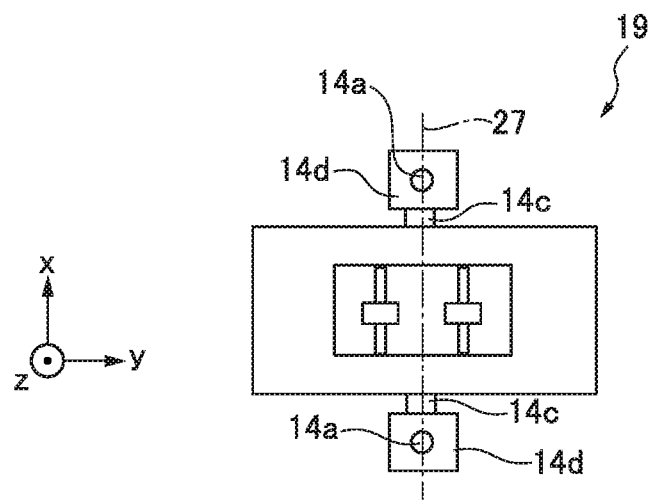
FIGS. 5A and 5B are schematic diagrams schematically showing another vibration body unit according to the first embodiment of the present invention.
Figure 5B:
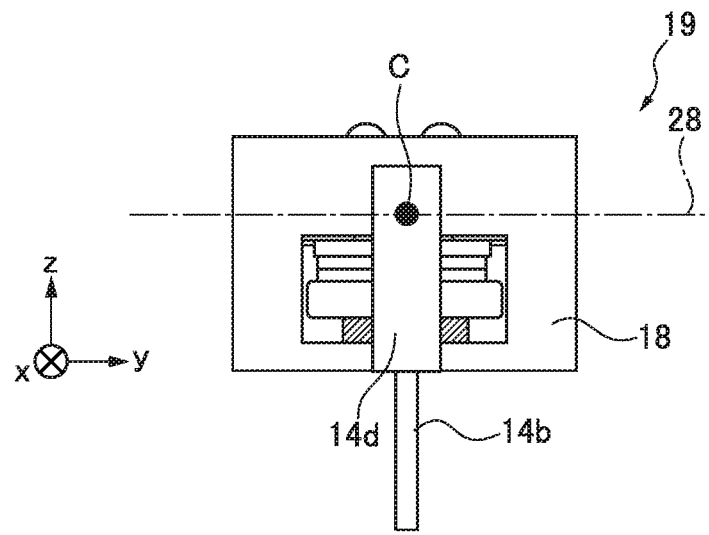

FIGS. 5A and 5B are schematic diagrams schematically showing another vibration body unit 19 according to the first embodiment of the present invention. FIG. 5A is a schematic plan view, and FIG. 5B is a schematic front view.

The vibration body unit 19 includes a holding unit 18 corresponding to a structure in which the holding unit 8 and the frame 10 in the vibration body unit 20 are integrally formed. The vibration body unit 19 has two supporting guide units 14 each including a linear guide and a rotation guide. The supporting guide unit 14 as the linear guide is configured in the same manner as the supporting guide unit 14 in the vibration body unit 20. Specifically, a guide shaft 14b is provided slidably in the z-axis direction with respect to a hole 14a provided in a guide main body 14d. Furthermore, the guide main body 14d and the holding unit 18 are supported by a rotation guide 14c that is relatively rotatable about an axis 27 that passes through a point C in FIG. 3B and is in parallel with the x axis. The point C is preferably provided on a plane 28 that is the same as the frictional sliding plane on which the protrusions 2a and the contact body 4 frictionally slide. The other elements of the vibration body unit 19 are configured as in the vibration body unit 20.

Figure 6:
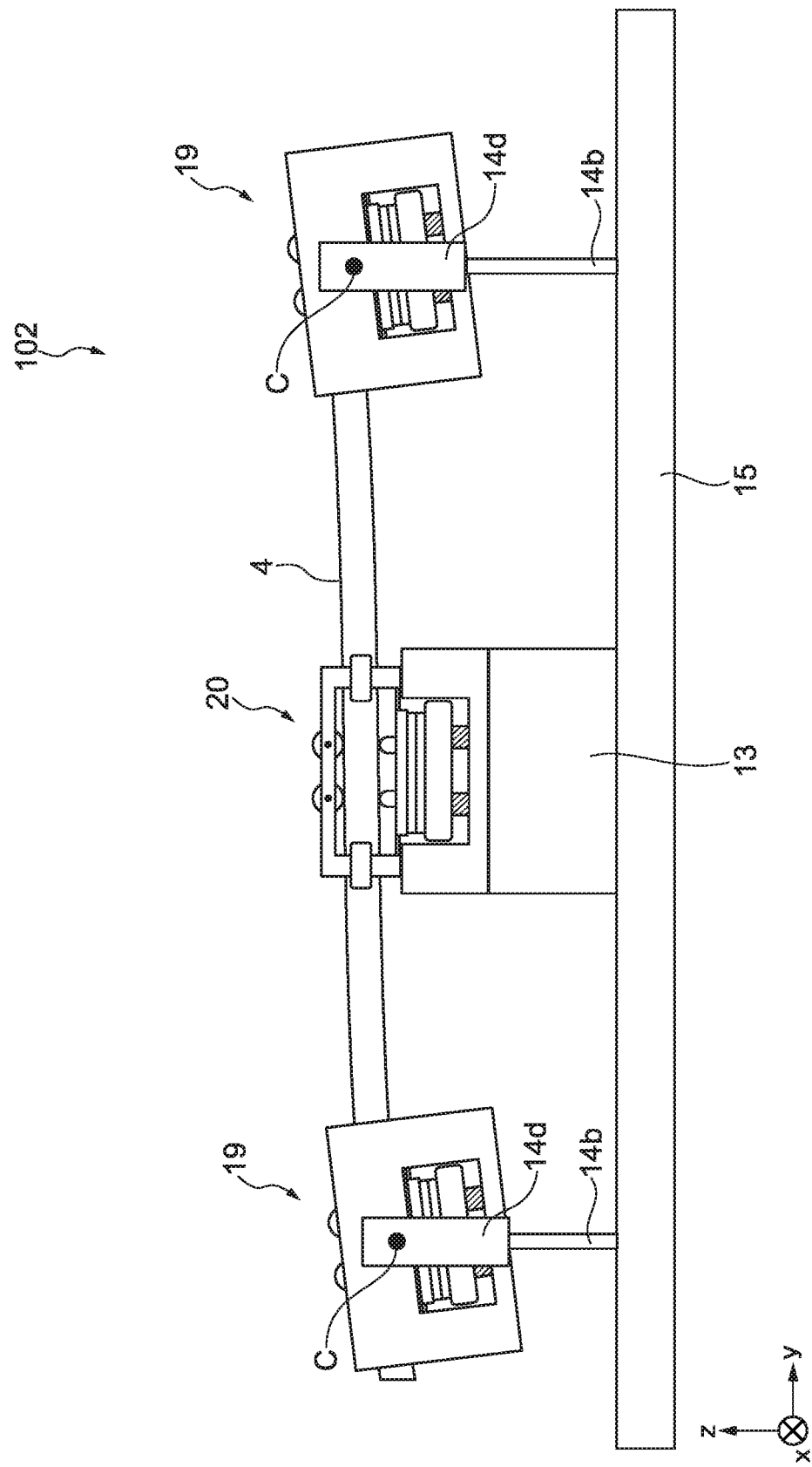
FIG. 6 is an explanatory diagram showing a behavior of another vibration-type actuator when the contact body is warped in the first embodiment of the present invention.

With reference to FIG. 6, a description will be given on a technical effect of the above-described other vibration body unit 19. FIG. 6 is an explanatory diagram showing the behavior of a vibration-type actuator 102 in a case where the contact body 4 is warped in a plane parallel to the yz plane.

The vibration-type actuator 102 includes three vibration body units 19 and 20. The vibration body unit 20 positioned at the center is fixed to a main body 15 via a restriction unit 13. Each of the vibration body units 19 positioned at both ends has the above-described guide shaft 14b whose lower end is fixed to the main body 15. In this example, each of the vibration body units 19 at both ends is slidable in the z-axis direction due to a hole 14a and the guide shaft 14b, and is rotatable in the yz plane due to a rotation guide 14c. Thus, the vibration-type actuator 102 can more effectively follow the shape of the contact body 4, and thus can suppress the variation among the vibration body units 19 and 20 in the pressing force of the vibration body 1 against the contact body 4 or in the reaction force generated on the reaction force receiving unit 9.

Furthermore, the rotation center C of the rotation guide 14c is disposed on the plane including the frictional sliding plane. This can suppress application of bending moment on the linear guide due to rotation moment within the yz plane generated when the thrust in the y-axis direction is generated by the vibration body units 19 at both ends. As a result, the vibration body units 19 and 20 can appropriately and efficiently generate thrust on the contact body 4, while preventing wearing and damage due to excessive force.

Figure 7A:
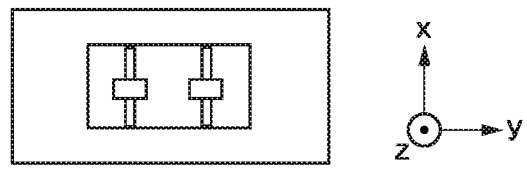
FIGS. 7A to 7D are schematic diagrams schematically showing another vibration body unit according to the first embodiment of the present invention.
Figure 7B:
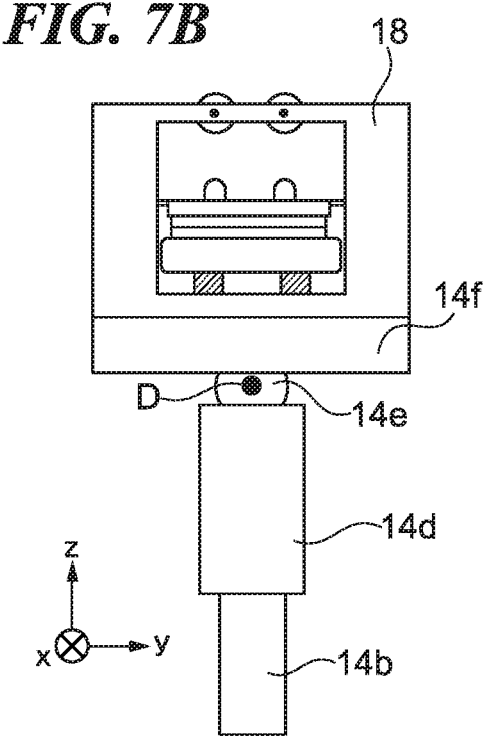
Figure 7C:
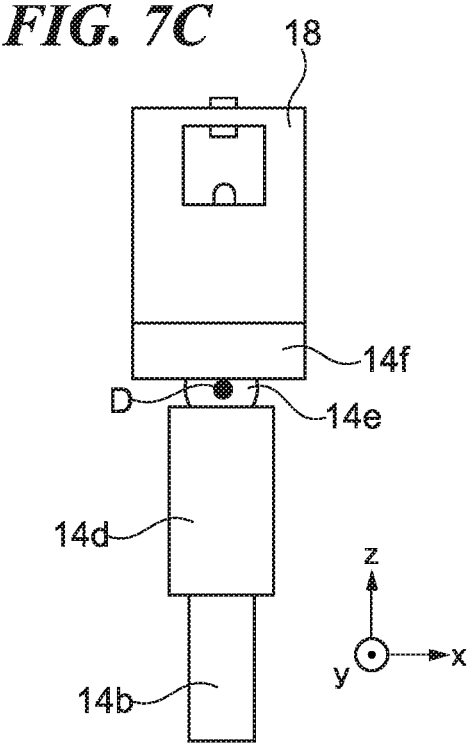
Figure 7D:
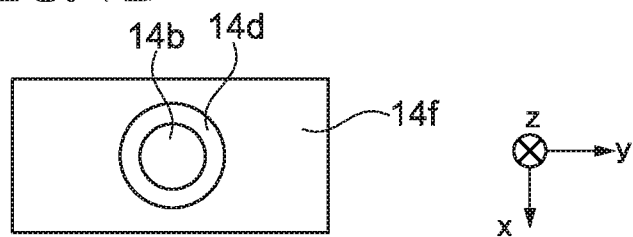

FIGS. 7A to 7D are schematic diagrams schematically showing another vibration body unit 21 according to the first embodiment of the present invention. FIG. 7A is a schematic plan view, FIG. 7B is a schematic front view, FIG. 7C is a schematic right side view, and FIG. 7D is a schematic bottom view.

The vibration body unit 21 includes one supporting guide unit 14 including a linear guide and a spherical guide. The supporting guide unit 14 as the linear guide is configured in the same manner as the supporting guide unit 14 in the vibration body units 19 and 20, and specifically, is provided with a guide shaft 14b slidably in the z-axis direction with respect to a hole 14a provided in a guide main body 14d.

An attachment 14f is attached to the bottom of the holding unit 18. The guide main body 14d and the attachment 14f are relatively rotatable in any direction (in each of the x-axis, y-axis, and z-axis) about a center point D of a ball joint 14e and via the ball joint 14e.

Figure 8A:
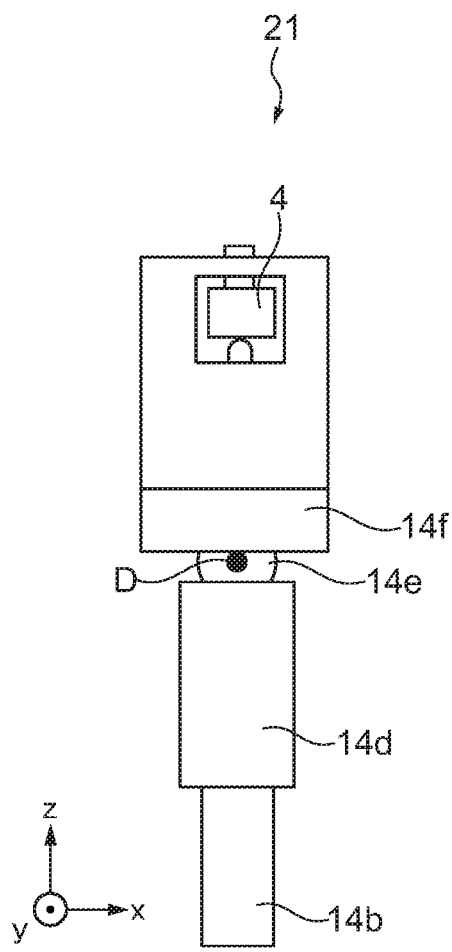
FIG. 8A and FIG. 8B are explanatory diagrams showing the behavior of the vibration body unit when the contact body is twisted in the first embodiment of the present invention.
Figure 8B:
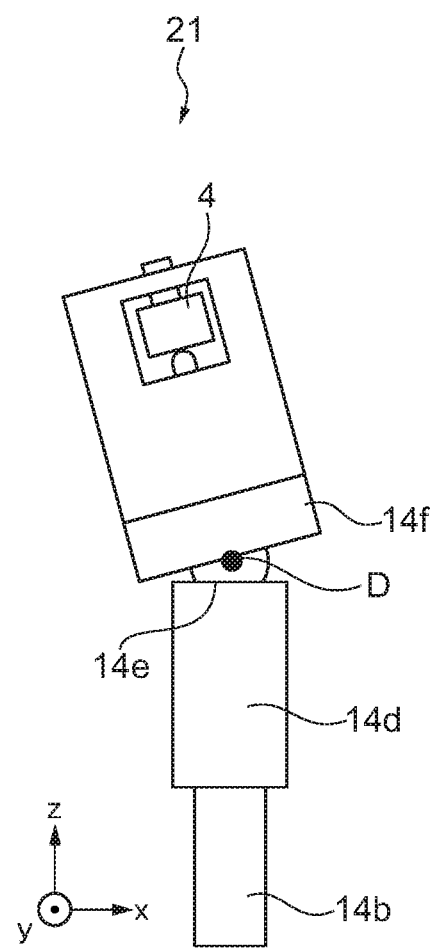

With reference to FIG. 8A and FIG. 8B, the behavior of the vibration body unit 21 in a case where twisting deformation is occurring in the contact body 4 will be described. FIGS. 8A and 8B are side views of the vibration body unit 21 as viewed from the y-axis direction. FIG. 8A shows a state where the contact body 4 is not twisted, and FIG. 8B shows a state where twisting deformation on the zx plane is occurring in the contact body 4.

As shown in FIG. 8B, since the vibration body unit 21 is provided with a spherical guide (ball joint 14e), the vibration body unit 21 can follow the twisting of the contact body 4 on the zx plane. As a result, the vibration body unit 21 can stably support the contact body 4 while applying pressure, whereby thrust in the y-axis direction can be generated with respect to the contact body 4 appropriately and efficiently.

Figure 9:
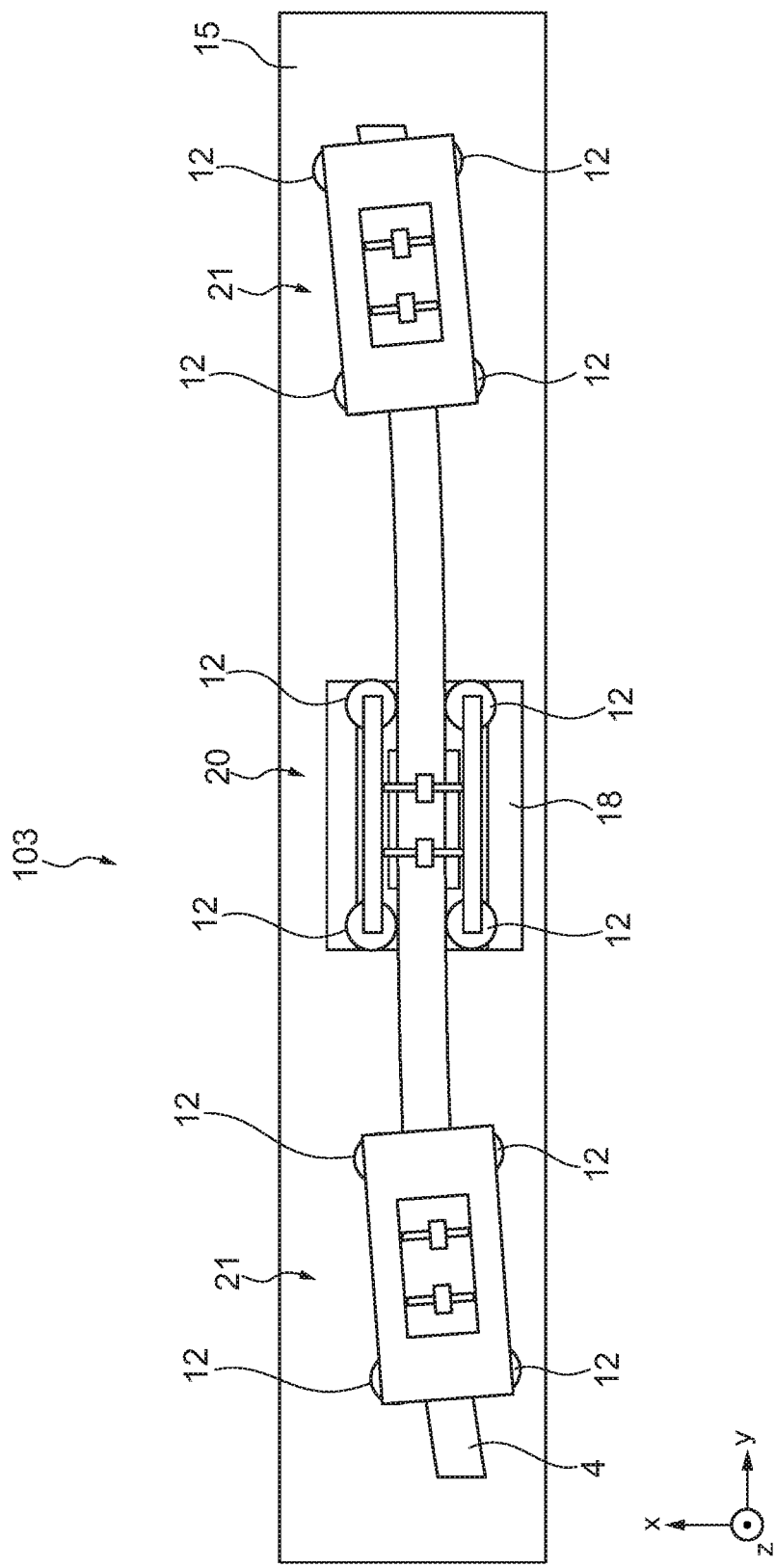
FIG. 9 is a schematic diagram schematically showing another vibration-type actuator according to the first embodiment of the present invention.

FIG. 9 is a schematic diagram schematically showing another vibration-type actuator 103 according to the first embodiment of the present invention.

The vibration-type actuator 103 includes three vibration body units 20 and 21. The vibration body unit 20 positioned at the center is fixed to a main body 15 via a restriction unit 13. Each of the vibration body units 21 positioned at both ends has the above-described guide shaft 14b whose lower end is fixed to the main body 15.

The vibration body unit 21 is provided with a contact body supporting unit 12, to be capable of following a contact body 4 deformed in a plane parallel to the xy plane. According to the present example in which the vibration body units 21 are configured as a linear guide and a spherical guide, the vibration body units 21 at both ends are slidable in the z-axis direction and are three-dimensionally rotatable about the center point D. Thus, the vibration-type actuator 103 can more effectively follow the shape of the contact body 4, and thus can suppress the variation between the vibration body units 20 and 21 in the pressing force of the vibration body 1 against the contact body 4 or in the reaction force generated on the reaction force receiving unit 9.

FIGS. 10A and 10B are schematic diagrams schematically showing alternative vibration-type actuator 104 according to the first embodiment of the present invention. FIGS. 10A and 10B are schematic plan views of the vibration-type actuator 104.

The vibration-type actuator 104 includes three vibration body units 20. The vibration body unit 20 positioned at the center is fixed to a main body 15 via a restriction unit 13. Each of the vibration body units 20 positioned at both ends has an elastic supporting unit 14g and a fixed portion 14h. The upper end of the elastic supporting unit 14g is attached to a holding unit 8, and the lower end of the elastic supporting unit 14g is attached to the fixed portion 14h. The fixed portion 14h is fixed to a main body 15. It should be noted that the fixed portion 14h may be formed integrally with the main body 15. The elastic supporting unit 14g is made of an elastic material, having elasticity in all directions, such as rubber, urethane, nonwoven fabric, for example. The fixed portion 14h is made of a rigid material, having high rigidity, such as resin, metal, ceramics, for example.

The elastic supporting unit 14g functions as a supporting guide unit that supports the holding unit 8 and the fixed portion 14h such that their orientation (relative positional relationship) can be changed. FIG. 10B is an explanatory diagram showing the behavior of a vibration-type actuator 104 in a case where the contact body 4 is warped in a plane parallel to the yz plane. With the elastic supporting unit 14g deformed, each of the vibration body units 20 can follow the shape of the contact body 4 and generate the thrust. The supporting guide units 14 of the above-mentioned vibration body units 19, 20, and 21 can be configured as in the example described above.

In the above-described configuration, a reaction force receiving unit 9 and a contact body supporting unit 12 are provided in the vibration body units 19, 20, and 21 as separate components. However, as shown in FIGS. 11A to 11D, it is also possible to employ a configuration in which one (set of) component(s) serves as both the reaction force receiving unit and the contact body supporting unit.

Figure 11A:
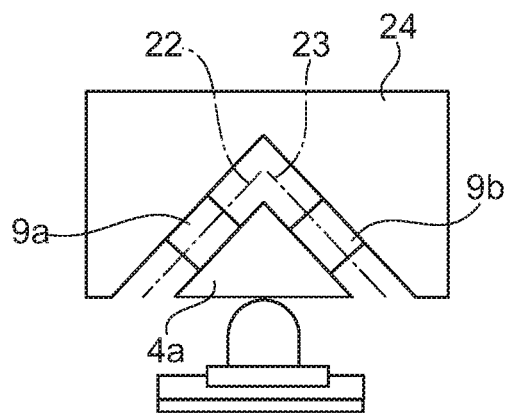
FIG. 11A to 11D are explanatory diagrams each showing a configuration in which one (set of) component(s) serves as both a reaction force receiving unit and a contact body supporting unit in the first embodiment of the present invention.

FIG. 11A shows rollers 9a and 9b functioning as a reaction force receiving unit and as a contact body supporting unit. These two types of rollers 9a and 9b are provided to a frame 24 having a groove having a V-shape in cross section. In this example, a contact body 4a having a triangular cross section is pressed by the vibration body 1 in the z-axis direction (upward direction in the drawing). The rollers 9a and 9b rotate about rotation axes 22 and 23, respectively, to follow the contact body 4a. The rollers 9a and 9b function as a reaction force receiving unit in which reaction force of the pressing force in the z-axis direction is generated due to the pressing of the contact body 4a, and as a contact body supporting unit that restricts the degree of freedom of the contact body 4a in the x-axis direction.

Figure 11B:
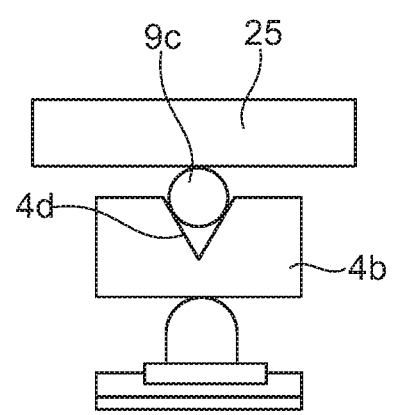

FIG. 11B shows a rolling body 9c that functions as a reaction force receiving unit and as a contact body supporting unit. The spherical rolling body 9c is provided to the frame 25. In this example, the contact body 4b provided with a V-shaped groove 4d extending in the y-axis direction is pressed by the vibration body 1 in the z-axis direction (upward direction in the drawing). The rolling body 9c fit in the groove 4d of the contact body 4b functions as a reaction force receiving unit on which reaction force of the pressing force in the z-axis direction is generated due to the pressing of the contact body 4b, and as a contact body supporting unit that restricts the degree of freedom of the contact body 4b in the x-axis direction.

Figure 11C:
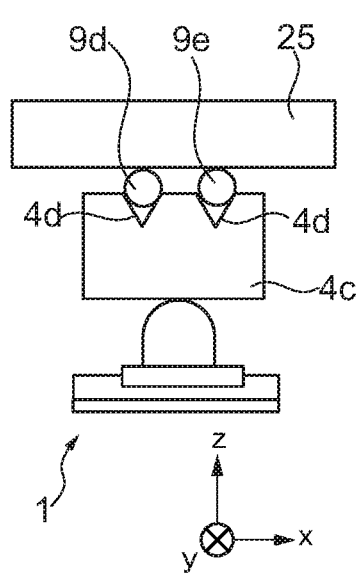

As shown in FIG. 11C, rolling bodies 9d and 9e similar to that in FIG. 11B may be provided in a plurality of V-shaped grooves 4d provided in the contact body 4c.

Figure 11D:
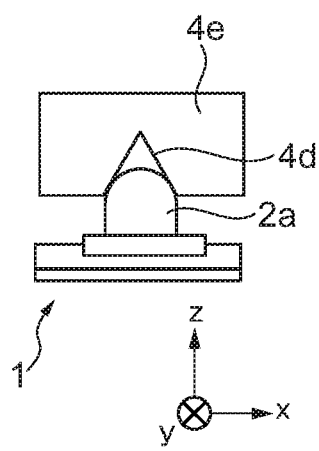

Alternatively, as shown in FIG. 11D, a protrusion 2a may be pressed against the slopes of the V-shaped groove 4d on the frictional sliding plane side of the contact body 4e. In this example, the protrusion 2a of the vibration body 1 functions as a reaction force receiving unit and as a contact body supporting unit. With the configuration described above, the number of components in the vibration body units 19, 20, and 21 is reduced, whereby the configuration is simplified.

In the above-described configuration, one vibration-type actuator 101, 102, 103, 104 having three vibration body units 19, 20, 21 is described, but the present embodiment is not limited to the above-described configuration. The number of vibration body units included in the vibration-type actuator can be appropriately changed according to the specifications of the vibration-type actuator such as length and thrust.

In the above-described configuration, the vibration-type actuator is described including: the vibration body unit having the restriction unit 13 and arranged at the center; and the vibration body units movable at least in the z-axis direction and arranged at both ends. However, the present embodiment is not limited to the configuration described above. The restriction unit 13 may be provided at any appropriate position of the vibration-type actuator. Furthermore, a plurality of the restriction units 13 may be provided in the vibration-type actuator.

In the configuration described above, the four contact body supporting units 12 are provided in the vibration body unit 20 having the restriction unit 13, but the number of contact body supporting units in the vibration-type actuator may be any number of three or more. It suffices if at least one of the three or more contact body supporting units 12 is provided on the vibration body unit 20 having the restriction unit 13, and the other contact body supporting units 12 may be provided to the vibration body unit 19, 20, 21 having no restriction unit 13.

In the above-described configuration, the reaction force receiving unit 9 and the contact body supporting unit 12 are each a roller that can rotate about an axis at a predetermined position and can support the contact body. Alternatively, as the reaction force receiving unit and the contact body supporting unit, a roller with a movable rotation axis and with a static preload configuration biased against the contact body by an elastic body such as a spring, and any sliding guide mechanism that can support the contact body may be adopted. The number, shape, and position of the reaction force receiving units 9 in one vibration body unit 19, 20, or 21 are arbitrarily set, and any element that can receive the reaction force of the pressing of the vibration body 1 against the contact body 4 (4a to 4e) may be adopted as the reaction force receiving unit 9.

In the above-described configuration, the contact body 4 (4a to 4e) is described as a flexible and substantially rectangular parallelepiped configuration extending in the y-axis direction and integrally formed. Alternatively, the contact body may be formed by a plurality of contact body elements, each having a strip shape, being connected in series.

In the above-described configuration, plural vibration body units are fixed and the contact body moves. However, the present embodiment is also applicable to a configuration in which the plural vibration body units move relative to the fixed contact body. That is, in the vibration-type actuator of the present embodiment, it suffices if the contact body and the vibration bodies are relatively movable in the predetermined direction.

A vibration-type actuator according to a second embodiment of the present invention will be described with reference to FIGS. 12 to 17D. It should be noted that common coordinate axes (x axis, y axis, z axis) are shown in FIGS. 12 to 17D related to the second embodiment, as in the first embodiment. In each of the exemplary embodiments described below, elements with the same operations and functions as those of the first exemplary embodiment will be denoted by the reference numerals used in the above description, and their description will be omitted as appropriate.

FIG. 12 is a schematic front view of a vibration-type actuator 201 according to the second embodiment of the present invention. The vibration-type actuator 201 includes three vibration body units 30 arranged in series in the y-axis direction (predetermined direction) in which the contact body 4 moves. One contact body 4 is moved by the three vibration body units 30 in the y-axis direction.

Each vibration body unit 30 has two vibration bodies 1 arranged to face each other with the contact body 4 provided in between. The protrusions 2a of each vibration body 1 are pressed against the contact body 4. In comparison with the first embodiment, the vibration body unit 30 according to the second embodiment corresponds to a configuration in which the reaction force receiving unit 9 of the vibration body unit 20 of the first embodiment is replaced with the protrusion 2a of the vibration body 1. Preferably, a friction material 4a is provided on both surfaces of the contact body 4. A holding unit 26 has a configuration corresponding to the holding unit 8 and the frame 10 of the vibration body unit 20 in the first embodiment. The vibration body 1 held by the holding unit 26 presses the contact body 4 by a mechanism similar to that in the first embodiment.

As shown in FIG. 12, a contact body supporting unit 12 is provided at an end of each of the vibration body units 30 positioned at both ends among the three vibration body units 30. The contact body supporting units 12 are disposed on the holding units 26, restrict the degree of freedom of the contact body 4 in the x-axis direction, and guide the contact body 4 in the y-axis direction. Each of the vibration body units 30 at both ends includes a rotation fulcrum type restriction unit 31. The restriction units 31 each supports the corresponding vibration body unit 30 rotatably about a fulcrum A, B in a plane parallel to the yz plane, and restricts the position in the y-axis direction and the z-axis direction. The restriction unit 31 is formed of, for example, a hinge and an elastic hinge. The holding unit 26 of the vibration body unit 30 is fixed to the main body 15 via the restriction unit 31. The restriction units 31 relatively position the respective vibration body units 30 at both ends with respect to the main body 15. The contact body 4 is accurately positioned with respect to the main body 15 via the restriction units 31. On the other hand, the center vibration body unit 30 is supported relatively slidably in the z-axis direction, by the supporting guide unit 14 which is a linear guide. Guide shafts 14b attached to the main body 15 are inserted into holes (not shown) provided in the holding unit 26. It is particularly preferable to adopt the configuration of the present example to a case where the length of the vibration-type actuator in the y-axis direction is equal to or longer than a predetermined length.

According to the above configuration, with the reaction force receiving unit 9 replaced by the protrusion 2a of the vibration body 1 as compared with the first embodiment, the thrust can be increased due to an increase in the number of protrusions 2a coming into contact with the contact body 4, and the configuration can be simplified due to the omission of the reaction force receiving unit 9. Furthermore, with the contact body supporting units 12 provided to the vibration body units 30 at both ends, the positioning accuracy of the contact body 4 in the in-plane direction can be further improved.

FIGS. 13A and 13B are schematic diagrams schematically showing another vibration-type actuator 202 according to the second embodiment of the present invention. FIG. 13A is a schematic plan view, and FIG. 13B is a schematic front view. The vibration-type actuator 202 moves one contact body 4 in the y-axis direction by the three vibration body units 30.

The vibration body units 30 at both ends are restricted and positioned with respect to the main body 15 by respective rotation fulcrum-type restriction units 31 for rotation about points H and I. The center vibration body unit 30 is supported relatively slidably in the z-axis direction, by a supporting guide unit 14 which is a linear guide. A main body 15 has both ends provided with contact body supporting units 12 for restricting the contact body 4 about an axis parallel to the z-axis and guiding the contact body 4 in the y-axis direction. The contact body supporting units 12 are, for example, rollers that can rotate about axes.

With the above configuration, the contact body supporting unit 12 is directly attached to the main body 15 and positioned, whereby the contact body 4 can be positioned with respect to the main body 15 with higher accuracy.

Figure 14A:
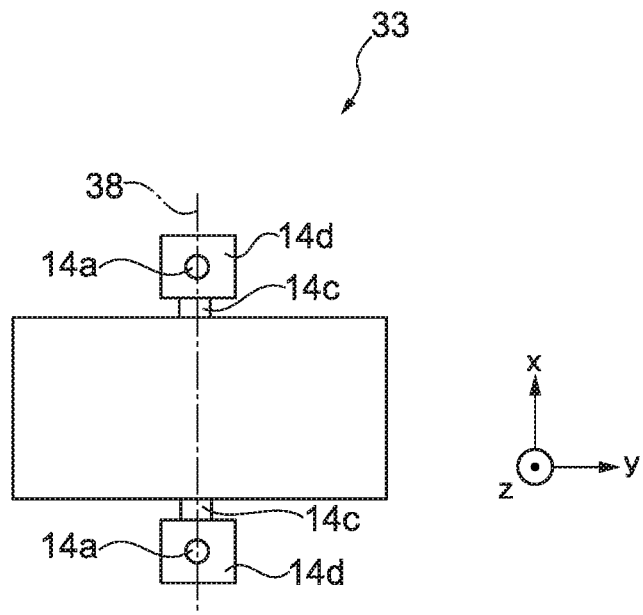
FIGS. 14A and 14B are schematic diagrams schematically showing another vibration body unit according to the second embodiment of the present invention.
Figure 14B:
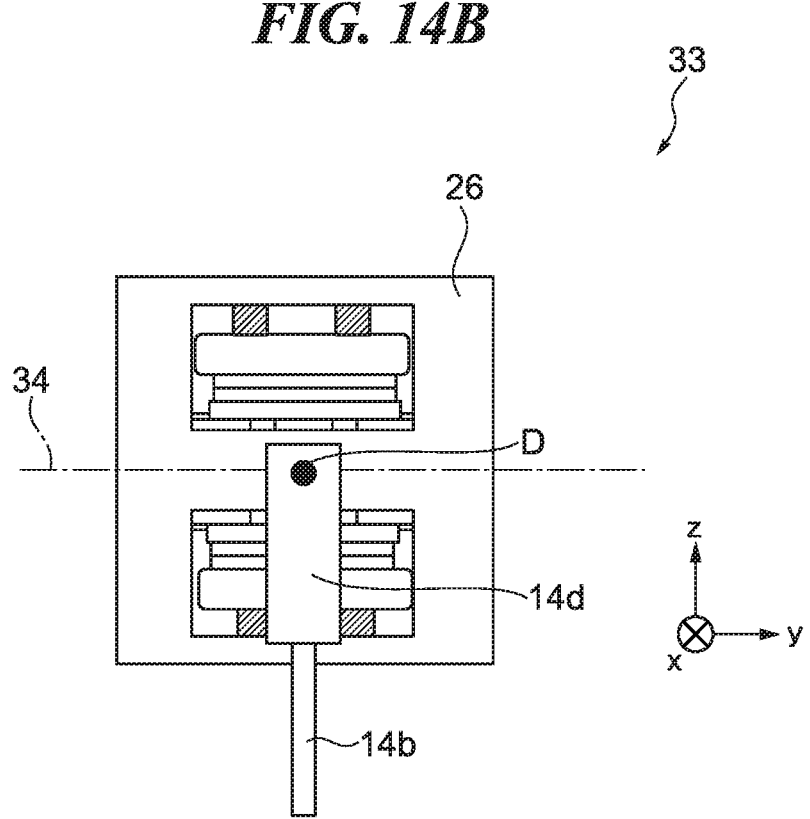

FIGS. 14A and 14B are schematic diagrams schematically showing another vibration body unit 33 according to the second embodiment of the present invention. FIG. 14A is a schematic plan view, and FIG. 14B is a schematic front view. The vibration body unit 33 includes two supporting guide units 14 each including a linear guide and a rotation guide, as in the vibration body unit 19 in FIG. 5A and FIG. 5B. The vibration body unit 33 as the linear guide is configured as described above. Specifically, a guide shaft 14b is provided slidably in the z-axis direction with respect to a hole 14a provided in a guide main body 14d. The guide main bodies 14d and the holding units 26 are supported by rotation guides 14c that can relatively rotate about an axis 38 in parallel with the x axis passing through a point D. Preferably, the point D is provided on a plane 34 positioned between (middle of) two (front and back) frictional sliding planes on which the contact body 4 and the protrusion 2a performs the frictional sliding. Preferably, the vibration body unit 33 described above is arranged at the center of the vibration-type actuators 201 and 202.

With the above configuration, the vibration-type actuators 201 and 202 can more effectively follow the shape of the contact body 4 as with the configuration in FIG. 6 according to the first embodiment. Furthermore, with the rotation center D of the rotation guide 14c disposed on the plane positioned between (middle of) the two frictional sliding planes, bending moment acting on the linear guide due to the rotation moment generated when the vibration body unit 33 generates a thrust in the y-axis direction can be suppressed.

As a result, the vibration body unit 33 can appropriately and efficiently generate thrust on the contact body 4, while preventing wearing and damage due to excessive force. It should be noted that a configuration in which the vibration body unit 33 is supported by the spherical guide shown in FIG. 7A to 8B or the elastic supporting unit shown in FIGS. 10A and 10B can also be adopted.

With reference to FIG. 15A to FIG. 15F, various configuration examples of a vibration body 1 of a vibration body unit that can support a contact body will be described. FIG. 15A to FIG. 15F are schematic side views each illustrating a method for supporting a contact body. It should be noted that the nonwoven fabric, the spacer, the pressing unit, and the holding unit (not shown) are configured as described above, and press the vibration body 1 against the contact body.

Figures 15A, 15B, 15C:
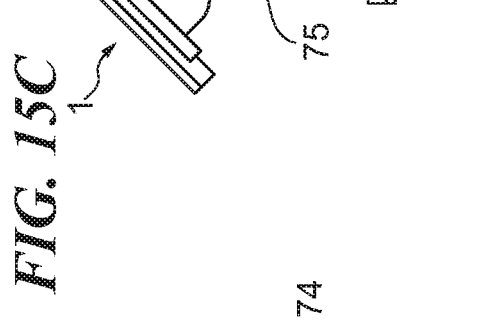
FIGS. 15A to 15F are explanatory diagrams showing various configuration examples of a vibration body of a vibration body unit capable of supporting the contact body in the second embodiment of the present invention.
Figures 15D, 15E, 15F:
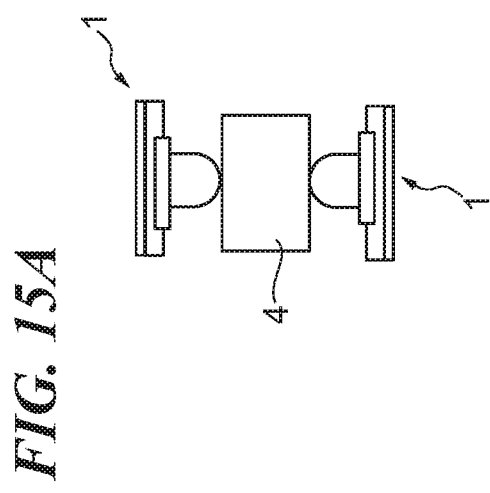

FIG. 15A shows an example in which two vibration bodies 1 facing each other support and guide the contact body 4 in the vibration body unit 30. FIG. 15B shows an example in which four vibration bodies 1 support and guide four respective side surfaces of a contact body 74 having a rectangular cross section. FIG. 15C shows an example in which three vibration bodies 1 are arranged at approximately 120° interval on the zx plane and support and guide a substantially cylindrical side surface of the contact body 75 having a substantially circular cross section. FIG. 15D shows an example in which three vibration bodies 1 are arranged at approximately 120° interval on the zx plane and support and guide side surfaces of a contact body 76 having a polygonal cross section. FIG. 15E shows an example in which a plurality of vibration bodies 1 and 81 different from each other in size and thrust support and guide side surfaces of a contact body 77 having a polygonal cross section. FIG. 15F shows an example in which two vibration bodies 1 and two reaction force receiving units 9 support and guide a substantially cylindrical side surface of a contact body 75 having a substantially circular cross section.

With the above configuration, the vibration bodies 1 can appropriately support and guide the contact bodies having various cross sections.

Figure 16A:
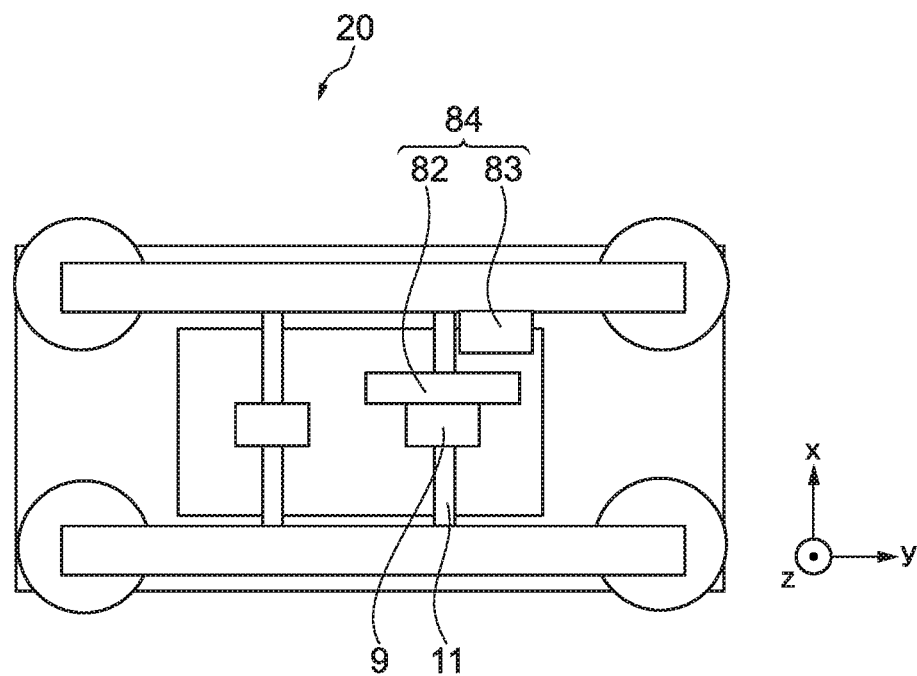
FIG. 16A and FIG. 16B are explanatory diagrams showing a configuration example of a vibration body unit including a displacement detecting unit.
Figure 16B:
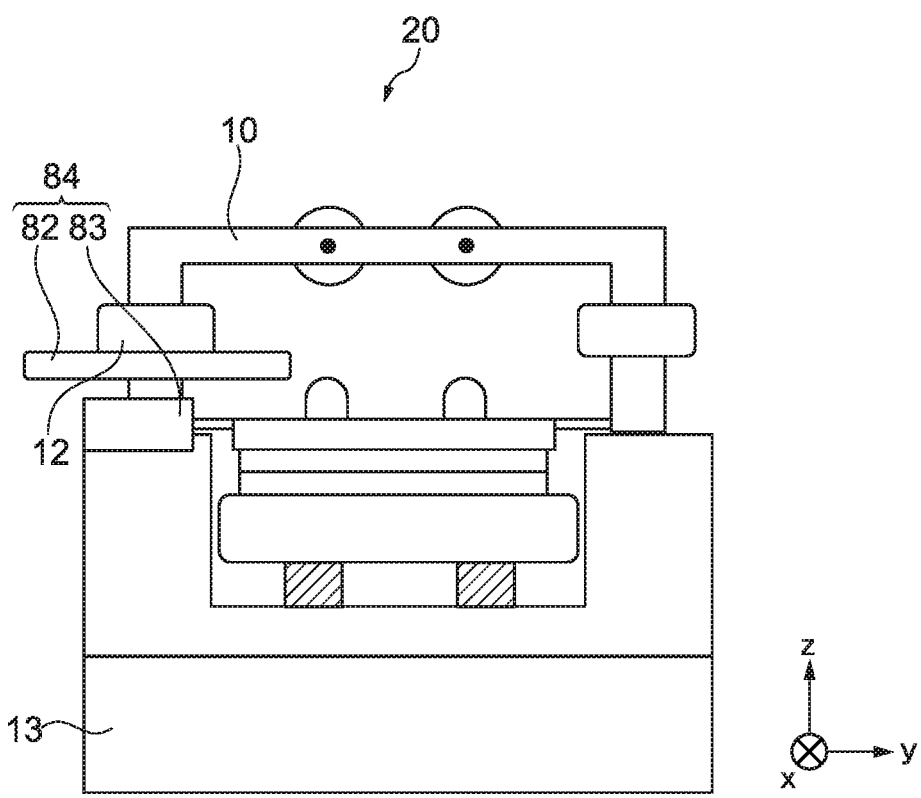

With reference to FIGS. 16A and 16B, a configuration example of a vibration body unit including a displacement detecting unit 84 will be described. This configuration example is applicable to both the first embodiment and the second embodiment. FIG. 16A is a schematic plan view of a first example, and FIG. 16B is a schematic front view of a second example. The displacement detecting unit 84 has a scale 82 and a detector 83.

In the example shown in FIG. 16A, the scale 82 is attached to a shaft 11 provided with a reaction force receiving unit 9, and is restricted by the reaction force receiving unit 9. Displacement of the contact body 4 causes the scale 82 to rotate together with the reaction force receiving unit 9 without slipping. The detector 83 detects the displacement of the contact body 4 in the y-axis direction by reading the rotational displacement of the scale 82.

In the example shown in FIG. 16B, the scale 82 is attached to a contact body supporting unit 12 provided to a frame 10. The displacement of the contact body 4 causes the scale 82 to rotate together with the contact body supporting unit 12. The detector 83 detects the displacement of the contact body 4 in the y-axis direction by reading the rotational displacement of the scale 82. Based on the displacement of the contact body 4 in the y-axis direction output by the detector 83, a conveyance parameter such as the position, speed, and acceleration of the contact body 4 can be controlled.

In the above two examples shown in FIGS. 16A and 16B, the scale 82 is attached at a position where it does not physically interfere with the contact body 4. The displacement detecting unit 84 is preferably provided to the vibration body unit including the restriction unit 13 to be capable of detecting the displacement with high accuracy, but may be provided at another location. As the displacement detecting unit 84, a configuration based on any suitable principle such as an optical type, a magnetic type, and a capacitance type can be adopted. The reflection-type displacement detecting unit 84 as in the above example may be used, or a transmission-type displacement detecting unit 84 may be used. Instead of the rotation-type displacement detecting unit 84 as described above, a direct acting type displacement detecting unit 84 in which a direct acting scale 82 is disposed on the contact body 4 and a detector 83 is arranged on the vibration body unit may be adopted. The relative position of the contact body 4 with respect to the main body 15 can be detected by applying the above displacement detecting unit 84 to the vibration body unit positioned on the main body 15 by being restricted by the restriction unit 13.

Figure 17A:
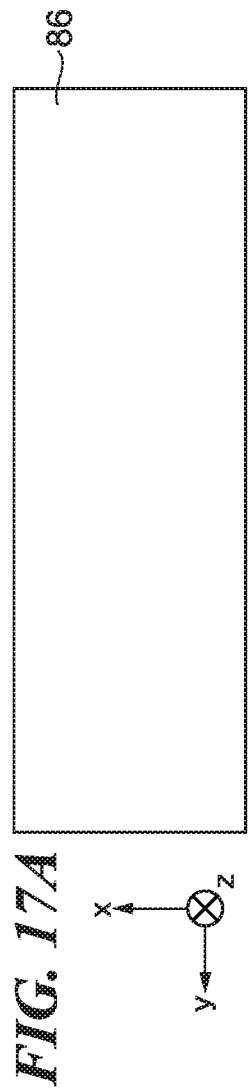
FIGS. 17A to 17D are explanatory diagrams showing a configuration example of an actuator unit that is a vibration-type actuator to which an exterior member is mounted.
Figure 17B:
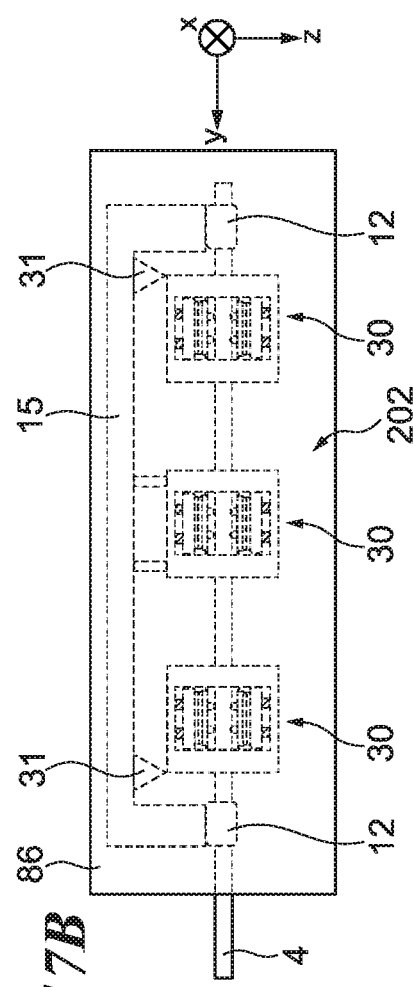
Figure 17C:
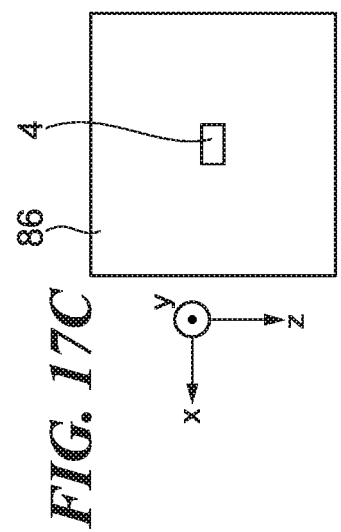
Figure 17D:
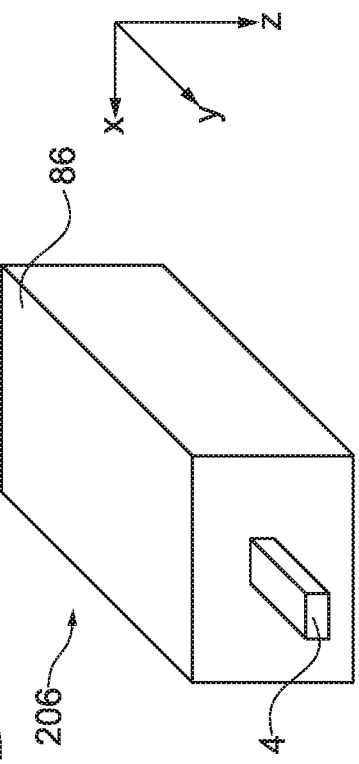

With reference to FIGS. 17A to 17D, a configuration example of an actuator unit 206 that is a vibration-type actuator having an exterior member 86 mounted to be unitized will be described. This configuration example is applicable to both the first embodiment and the second embodiment. FIG. 17A is a schematic plan view, FIG. 17B is a schematic front view, FIG. 17C is a schematic side view, and FIG. 17D is a schematic perspective view.

The actuator unit 206 has a structure in which the main body 15 of the vibration-type actuator 202 is fixed to the exterior member 86 and the contact body 4 can move in the y-axis direction via the side surface of the exterior member 86. In FIG. 17B, a broken line represents the vibration-type actuator 202 covered by the exterior member 86 to be not viewable. As shown in FIGS. 17A to 17D, the vibration-type actuator 202 is packaged by the exterior member 86, so as to be protected. It should be noted that while FIGS. 17A to 17D illustrate the vibration-type actuator 202 as an example, the exterior member 86 can be applied to and unitize any vibration-type actuators according to the embodiments of the present invention. It should be noted that the exterior member 86 may be integrally formed with the main body, the restriction unit, and the like.

In the above-described configuration, the rotating fulcrum type restriction unit and the moving fulcrum type restriction unit are described as an example of the restriction unit. While schematic configurations are described for the above restriction units, it should be understood that the above-described restriction units can of course be implemented by any appropriate mechanical element or mechanical component.

In a third embodiment, an application example (apparatus) using the vibration-type actuators according to the first embodiment and the second embodiment described above will be described.

Figure 18:
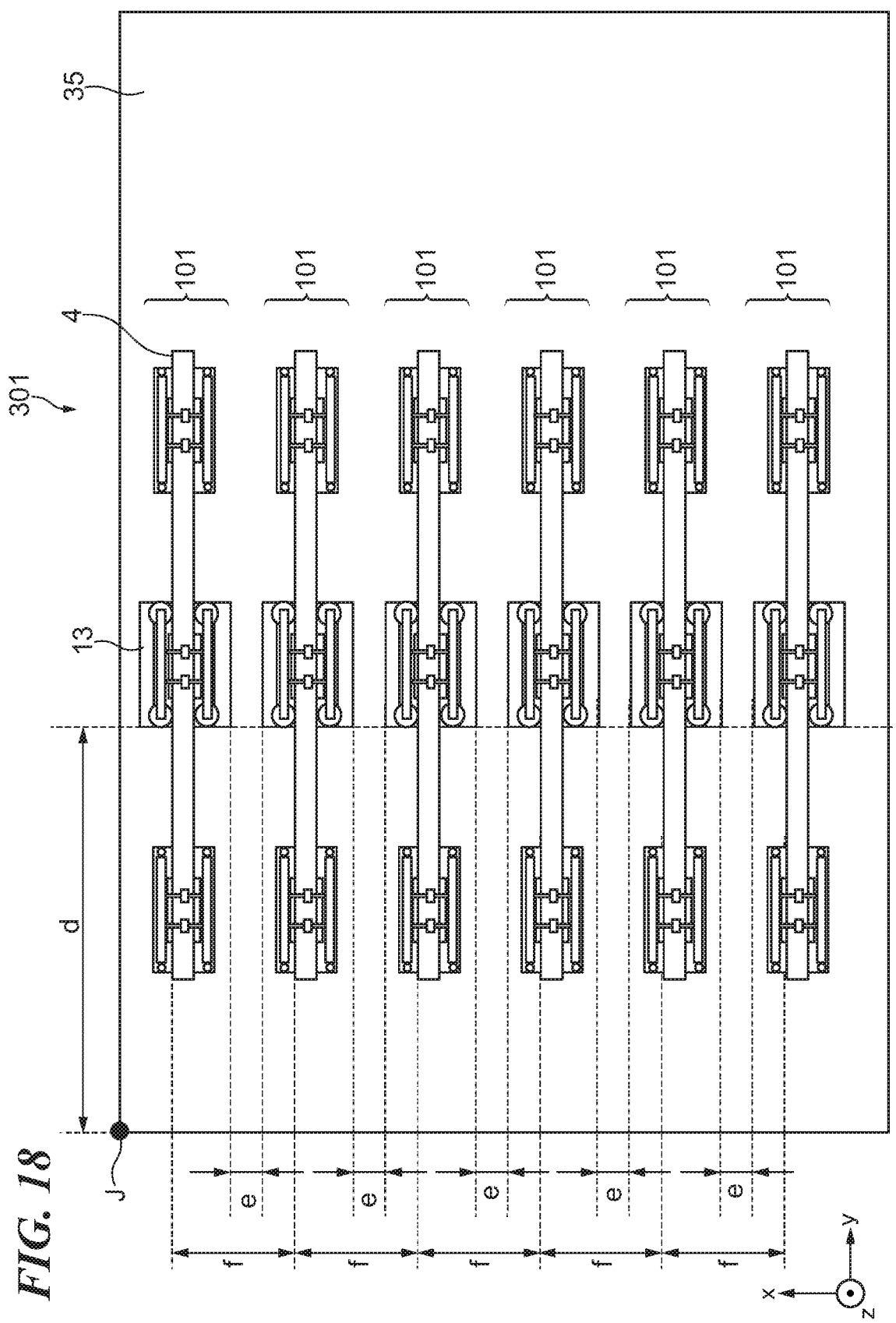
FIG. 18 is a schematic diagram schematically showing an apparatus according to a third embodiment of the present invention.

FIG. 18 is a schematic plan view of an apparatus 301 according to the third embodiment of the present invention. The apparatus 301 has six vibration-type actuators 101 and a main body 35. The main body 35 corresponds to a structure in which a plurality of main bodies 15 corresponding to the vibration-type actuators 101 are integrally formed so as to extend in the xy plane direction. Each of the vibration-type actuators 101 is fixed to the main body 35 with a restriction unit 13 serving as a reference position.

With the above configuration, the vibration-type actuators 101 can be easily aligned in a planar form. For example, the six vibration-type actuators 101 can be aligned at positions separated from the reference position J of the main body 35 by a distance d in the y-axis direction. Furthermore, in the x-axis direction, the six vibration-type actuators 101 are arranged with the adjacent restriction units 13 separated by a distance e, so that distance between any adjacent contact bodies 4 can be set to be a distance f (can be the same).

Figure 19A:
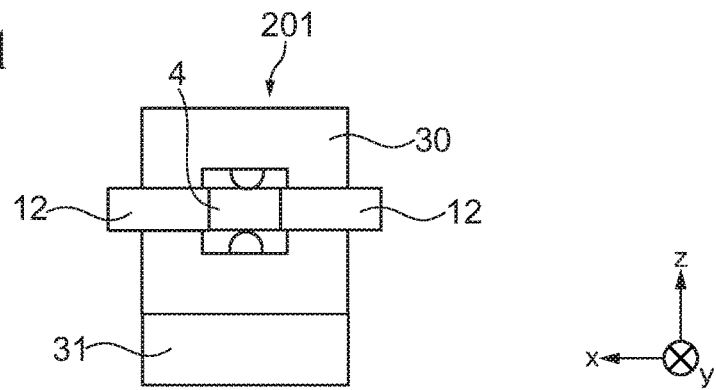
FIGS. 19A and 19B are schematic diagrams schematically showing another apparatus according to the third embodiment of the present invention.
Figure 19B:
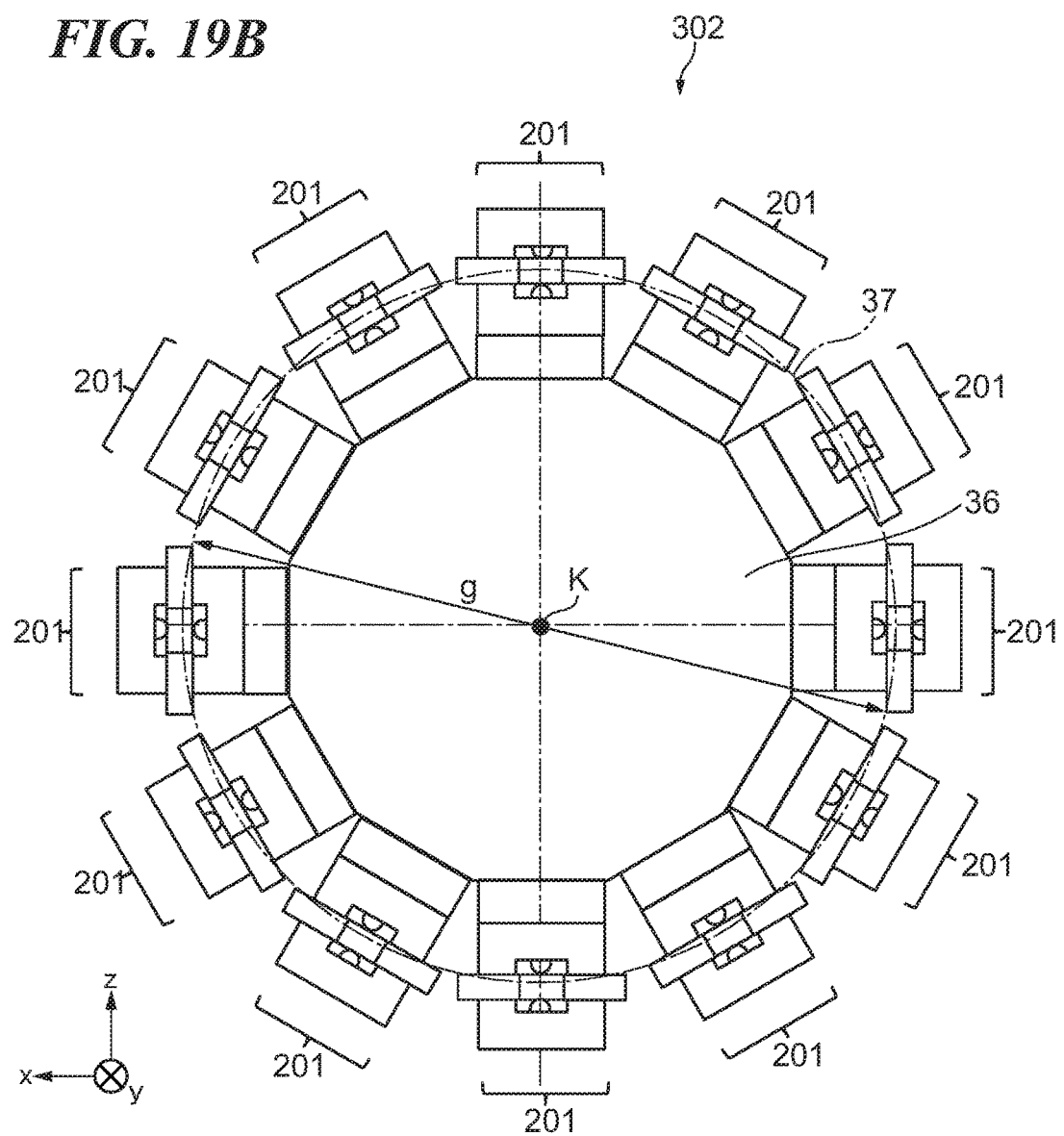

Another apparatus 302 according to the third embodiment of the present invention will be described with reference to FIGS. 19A and 19B. FIG. 19A is a schematic side view of a vibration-type actuator 201, and FIG. 19B is a schematic side view of the apparatus 302. The apparatus 302 includes 12 vibration-type actuators 201 and a main body 36. The main body 36 corresponds to a structure in which a plurality of main bodies 15 corresponding to the vibration-type actuators 201 are integrally formed. The main body 36 has a regular dodecagonal shape with a point K at the center, in a cross section in parallel with the zx plane. Each of the vibration-type actuators 201 is fixed to the main body 36 with a restriction unit 31 serving as a reference position. As shown in FIG. 19B, the 12 vibration-type actuators 201 are radially arranged so as to respectively correspond to 12 sides of the regular dodecagonal cross section on the zx plane.

With the above configuration, the contact bodies 4 can be accurately arranged on the circumference of a pitch circle 37 having a diameter g with the point K at the center as viewed in the y-axis direction.

In the above-described configurations, the vibration-type actuators 101 and 201 are positioned by the restriction units. However, any vibration-type actuators according to the embodiments of the present invention can be similarly positioned. Furthermore, in the apparatuses 301 and 302, the vibration-type actuators 101 and 201 are arranged in a planar form or radially. However, the vibration-type actuators may be positioned and arranged at arbitrary positions. Furthermore, the apparatus of the present embodiment has a configuration including one or more vibration-type actuators.

In a fourth embodiment, an application example (multi-axis stage unit) according to the above-described first to third embodiments will be described.

Figure 20:
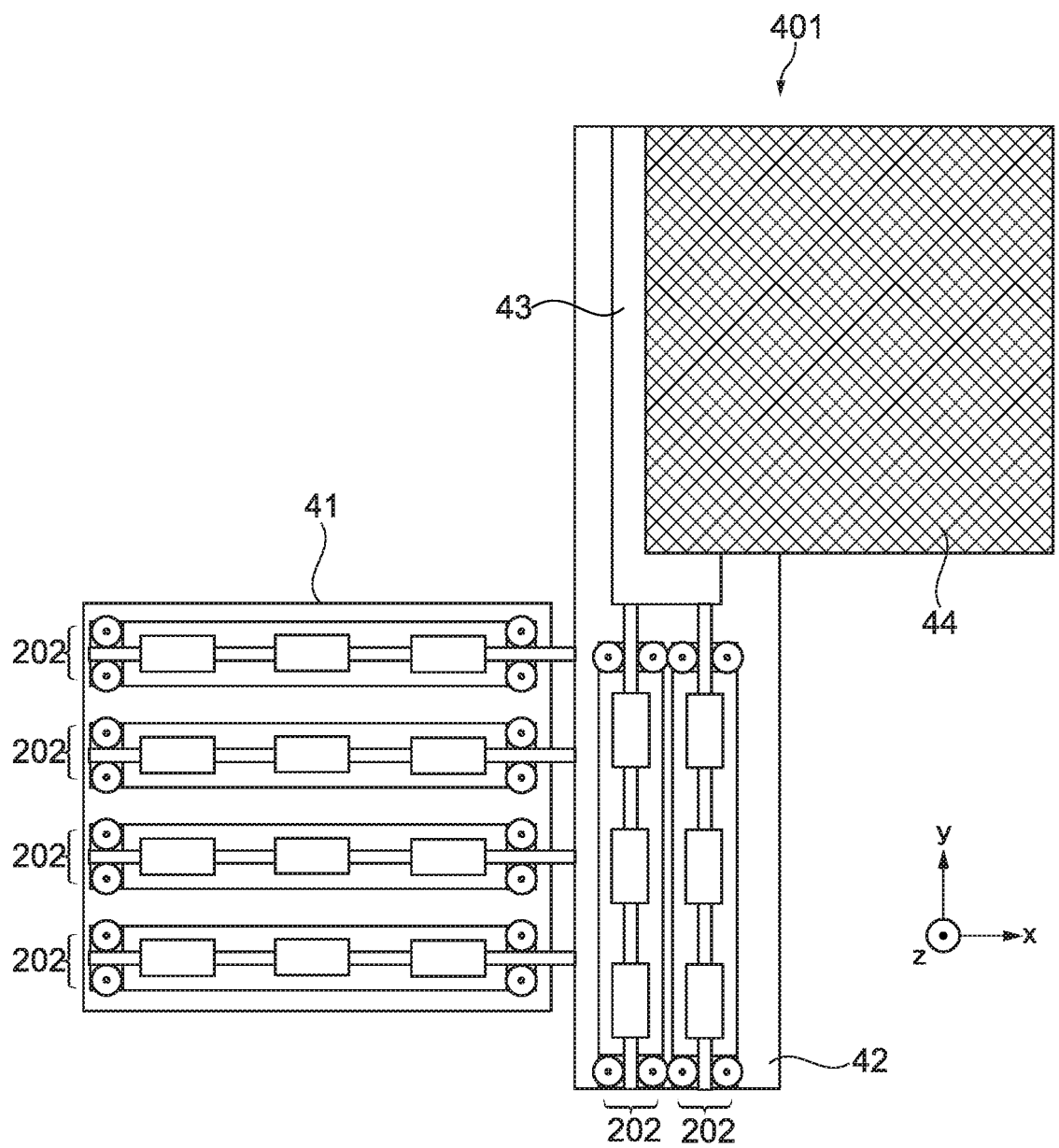
FIG. 20 is a schematic plan view showing a multi-axis stage according to a fourth embodiment of the present invention.

FIG. 20 is a schematic plan view of a multi-axis stage unit 401 according to the fourth embodiment of the present invention. The multi-axis stage unit 401 has a fixed portion 41, an x stage 42, a y stage 43, and an xy stage 44.

The degree of freedom of the fixed portion 41 is limited in all directions. Four vibration-type actuators 202 are arranged in the y-axis direction and fixed to the fixed portion 41 in a manner similar to that in the third embodiment described with reference to FIG. 18. The contact bodies 4 driven by the respective vibration-type actuators 202 of the fixed portion 41 are movable in the x-axis direction in FIG. 20, and have the right ends fixed to the x stage 42.

The x stage 42 is movable only in the x-axis direction, with the degrees of freedom restricted in other directions. On the x stage 42, two vibration-type actuators 202 are fixed side by side in the x-axis direction. The contact bodies 4 driven by the respective vibration-type actuators 202 on the x stage 42 are movable in the y-axis direction in FIG. 20, and have the upper ends fixed to the y stage 43.

The y stage 43 is movable only in the y-axis direction, with the degrees of freedom restricted in other directions. The xy stage 44 is fixed to the y stage 43. The xy stage 44 also moves in conjunction with the movement of the x stage 42 and/or the y stage 43.

According to the above configuration, a multi-axis stage unit can be implemented by using the vibration-type actuators according to the embodiments of the present invention described above. The mass movable by the vibration-type actuators 202 provided on the fixed portion 41 is larger than the mass movable by the vibration-type actuator 202 provided on the x stage 42. The number of vibration-type actuators 202 in each axis can be appropriately changed to enable the mass to be moved in each axis. Furthermore, with a plurality of vibration-type actuators 202 provided for moving each stage, generation of a moment acting in a plane parallel to the xy plane is suppressed, whereby the stage of each axis can be accurately moved.

In the configuration described above, the multi-axis stage unit 401 having the xy stage is implemented using the vibration-type actuators according to the embodiments of the present invention. Note that a stage unit having any degree of freedom can be obtained using the vibration-type actuators according to the embodiments of the present invention.

The number of vibration-type actuators on each axis can be increased or decreased as appropriate according to the load or the like on each axis. The multi-axis stage unit using the vibration-type actuators according to the embodiments of the present invention is applicable to various stage apparatuses such as a microscope, a machine tool, and a measuring apparatus.

In a fifth embodiment, another application example (articulated robot) according to the above-described first to third embodiments will be described.

Figure 21:
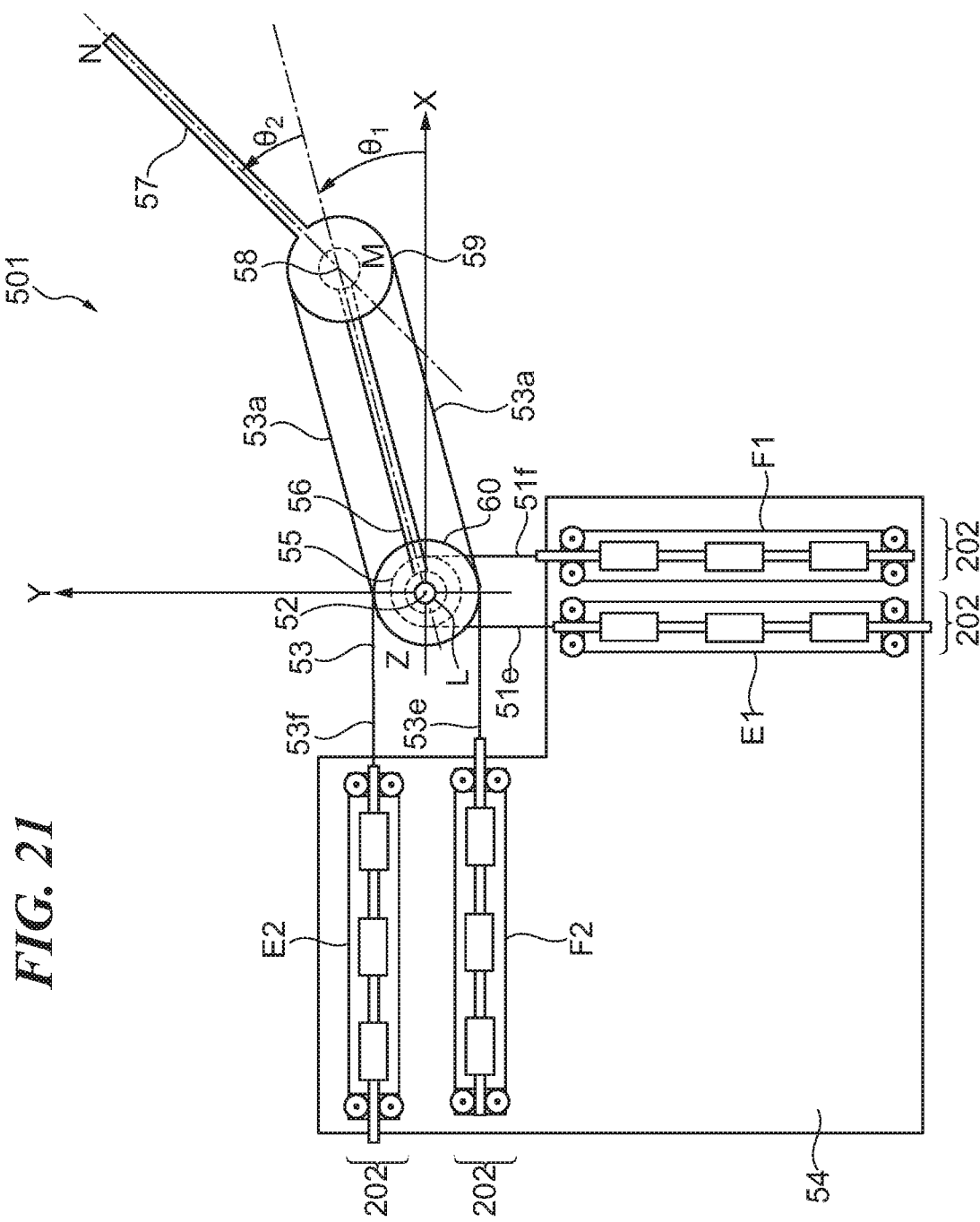
FIG. 21 is a schematic plan view showing an articulated robot according to a fifth embodiment of the present invention.

FIG. 21 is a schematic plan view of an articulated robot 501 according to the fifth embodiment of the present invention. The articulated robot 501 includes a first joint 52, a fixed portion 54, a first pulley 55, a first link 56, a second link 57, a second joint 58, a second pulley 59, and a third pulley 60. The vibration-type actuators 202 provided on the fixed portion 54 are denoted with respective reference numerals E1, F1, E2, and F2 to be distinguished from one another.

A framework of the articulated robot 501 including links and pulleys will be described. The first joint 52 is a joint around a point L having a rotational degree of freedom to be rotatable about the Z axis. The second joint 58 is a joint around a point M having a rotational degree of freedom to be rotatable about an axis parallel to the Z axis, and is restricted by the movement of the first link 56.

The first pulley 55 indicated by a hidden line is provided so as to be restricted by the first link 56 and to rotate about the first joint 52. The first link 56 and the second link 57 are provided so as to rotate about the second joint 58 and via the second joint 58. The second pulley 59 is restricted by the second link 57. The third pulley 60 is freely rotatable about the first joint 52.

A wire 51$f$ is connected to the contact body 4 of the vibration-type actuator F1, and is wound around the first pulley 55. A wire 51$e$ at the other end is connected to the contact body 4 of the vibration-type actuator E1. Similarly, a wire 53$f$ is connected to the contact body 4 of the vibration-type actuator F2 and is wound around the third pulley 60. A wire 53e at the other end is connected to the contact body 4 of the vibration-type actuator E2. An endlessly formed wire 53a is wound around the second pulley 59 and the third pulley 60.

A driving method for each vibration-type actuator 202 will be described. The vibration-type actuators E1 and F1 having the contact body 4 extending in the y-axis direction respectively drive the wires 51f and 51e in the y-axis direction. When the vibration-type actuators E1 and F1 generate thrusts toward the negative side in the y-axis direction to prevent the wires 51f and 51e from slacking, frictional force is generated between the wires 51f and 51e and the first pulley 55 due to a difference between the generated thrusts. Thus, the first link 56 can be driven around the first joint 52. That is, the vibration-type actuators E1 and F1 can cause the first link 56 to be displaced by an angle θ1 with respect to the x-axis.

The vibration-type actuators E2 and F2 having the contact body 4 extending in the x-axis direction respectively drive the wires 53f and 53e in the x-axis direction. When the vibration-type actuators E2 and F2 generate thrusts toward the negative side in the x-axis direction to prevent the wires 53f and 53e from slacking, frictional force is generated between the wires 53f and 53e and the second pulley 59 and the third pulley 60 due to a difference between the generated thrusts. With the above frictional forces, the first link 56 and the second link 57 can be driven around the first joint 52 and around the second joint 58. That is, the vibration-type actuators E2 and F2 can cause the first link 56 to be displaced by an angle θ1 with respect to the x-axis, and can also cause the second link 57 to be displaced by an angle θ2 with respect to the first link 56.

Furthermore, the vibration-type actuators E1 and F1 may be driven to offset the displacement of the first link 56 by the angle θ1 caused by driving the vibration-type actuators E2 and F2. Thus, only the displacement of the second link 57 by the angle θ2 may be caused.

With the above configuration, a tip N of the second link 57 can reach the target position in the xy plane with the vibration-type actuators 202 driven. By performing the antagonistic driving in a state where tension is constantly applied to prevent the wire from slacking, rattling around the joint and deviation due to buckling of the wire can be suppressed. Consequently, the torsional rigidity around each joint axis can be increased, and the tip N can be positioned with high accuracy.

The configuration described above with reference to FIG. 21 is merely an example of an articulated robot to which the antagonistic driving method is introduced. The vibration-type actuator or the apparatus including the vibration-type actuator according to the embodiment of the present invention can be used as a drive source for a vertical articulated robot or a parallel link-type robot with a higher degree of freedom.

The driving method implemented with the vibration-type actuator or the apparatus having the vibration-type actuator according to the embodiment of the present invention used as the driving source of the articulated robot is not limited to the antagonistic driving method. For example, as shown in FIG. 22, an articulated robot 502 of a type that pushes and pulls a wire within a thrust range causing no wire buckling can be configured.

Figure 23:
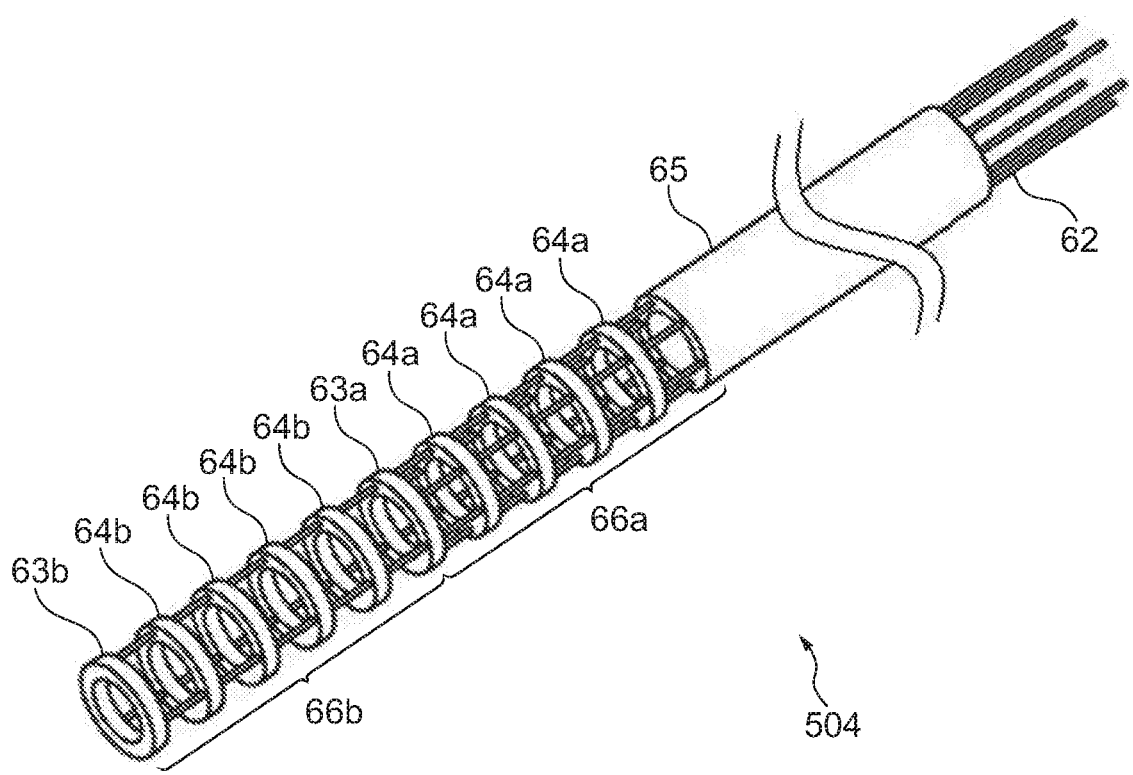
FIG. 23 is a schematic perspective view of a wire-driven manipulator disclosed in Japanese Laid-Open Patent Publication (kokai) No. 2018-140101.

FIG. 23 is a schematic perspective view of a wire-driven manipulator 504 disclosed in Japanese Laid-Open Patent Publication (kokai) No. 2018-140101 for driving a plurality of bending sections 66a and 66b. In Japanese Laid-Open Patent Publication (kokai) No. 2018-140101, three linear members 62 are provided for each bending section, and one of the three linear members 62 is fixed to a guide member 64a or a guide member 64b, and the other two linear members 62 are driven by an actuator so that the curvature of each bending section is changed.

Figure 22:
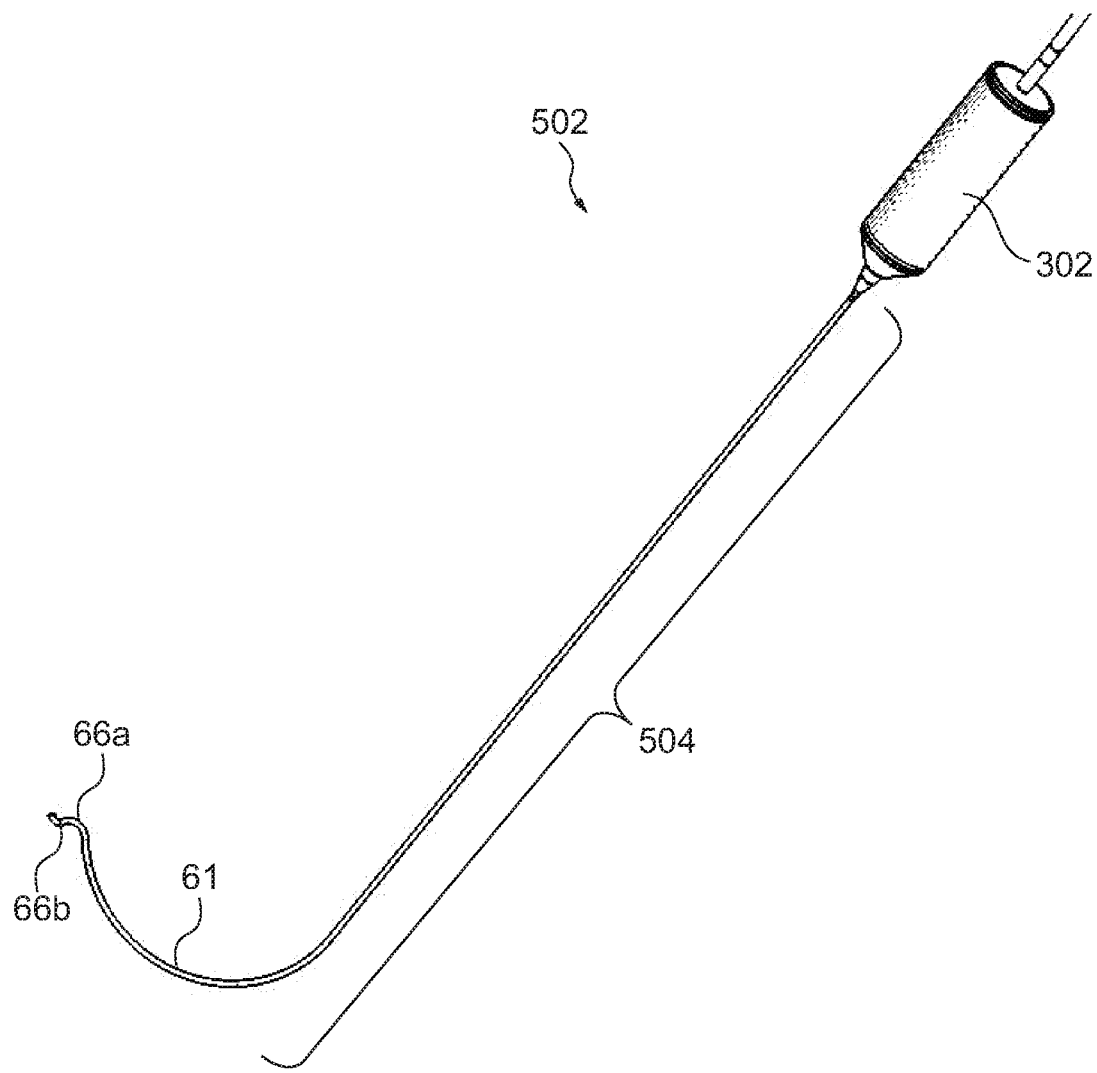
FIG. 22 is a schematic perspective view showing the articulated robot according to the fifth embodiment of the present invention.

FIG. 22 is a schematic plan view of another articulated robot 502 according to the fifth embodiment of the present invention. An articulated robot 502 shown in FIG. 22 can be used as a drive source for the wire-driven manipulator 504 described above. The articulated robot 502 has an apparatus 302 including a plurality of vibration-type actuators 201. With contact bodies 4 of the vibration-type actuators 201 connected to a linear member 62 in FIG. 23, the apparatus 302 can be used as a drive source for changing the curvature of each bending section. The apparatus 302 is preferably packaged using the exterior member 86, as in the configuration described with reference to FIGS. 17A to 17D. With the above-described packaging, the internal components can be appropriately protected, and the person can easily hold the apparatus 302. The linear member 62 can change the curvature of the plurality of bending sections by sliding in a guide tube provided in a linear member guide part 61 without buckling. As shown in FIG. 22, the linear member guide part 61 may be flexible. The plurality of bending sections can be formed using the guide member and the linear member disclosed in Japanese Laid-Open Patent Publication (kokai) No. 2018-140101.

According to the above-described configuration, by arranging the vibration-type actuators according to the embodiments of the present invention in the apparatus 302 with the restriction unit serving as a reference, the linear member that drives the wire-driven manipulator can be arranged with high accuracy. Therefore, the curvature of the bending section can be controlled with high accuracy. Since the vibration-type actuator according to the embodiment of the present invention is used as a drive source of the wire drive manipulator, the drive unit can be downsized. By increasing or decreasing the number of vibration body units, the output required in each bending section can be implemented. Furthermore, since the vibration body units use common components, the cost for a configuration change for increasing or decreasing the output can be reduced. Since the contact body of the vibration-type actuator according to the embodiment of the present invention can have lighter weight than in conventional cases, the responsiveness can be further improved as compared with a drive source in which an electromagnetic motor and a reduction mechanism are combined.

Further, by changing the amplitude ratio of the plurality of vibration modes shown in FIGS. 2A to 2C, the driving speed and thrust of the bending section can be freely controlled. When no voltage is applied to the electro-mechanical energy conversion element, the orientation of the bending section can be maintained by the static frictional force acting between the protrusion and the contact body. On the other hand, by implementing the excitation only in the vibration mode shown in FIG. 2B, the frictional force acting between the protrusion and the contact body can be changed. Furthermore, when an external force is applied to the bending portion, the orientation of the bending portion can be changed so that the external force is no longer applied. The above configuration can be applied to, for example, a safety mechanism used to avoid danger to the human body when the wire-driven manipulator touches the human body. The above-described articulated robot 502 can be applied to, for example, industrial endoscopes, medical endoscopes, and surgical instruments such as catheters used for medical activities such as treatment, biopsy, and examination.

In the above-described configuration, the articulated robot having four degrees of freedom with two bending sections is illustrated, but the bending section, that is, the degree of freedom can be easily increased. Therefore, an articulated robot having a higher degree of freedom can be provided. Preferably, the shape of the main body 36, the diameter g of the pitch circle 37, and the number and/or arrangement of the vibration-type actuators are changed as appropriate according to the number of bending sections to be driven and the diameter of the guide member.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-102981, filed May 31, 2019, which is hereby incorporated by reference herein in its entirety.

What is claimed is:

1. A vibration-type actuator comprising:
   a plurality of vibration body units each including a vibration body including an elastic body and an electro-mechanical energy conversion element; and
   a contact body configured to come into contact with a plurality of the vibration bodies, wherein the contact body and the plurality of the vibration bodies relatively move in a predetermined direction,
   a first vibration body unit, from among the plurality of vibration body units, includes a restriction unit configured to fix the first vibration body unit and restrict a degree of freedom in the predetermined direction, and
   a second vibration body unit, from among the plurality of vibration body units, includes a supporting guide unit configured to support the second vibration body unit while the second vibration body unit is movable in a direction orthogonal to the predetermined direction.

2. The vibration-type actuator according to claim 1, wherein the plurality of vibration body units are arranged in series in the predetermined direction.

3. The vibration-type actuator according to claim 1, wherein the contact body and at least one of the plurality of vibration bodies relatively move by a thrust generated by the at least one of the plurality of vibration bodies vibrating in accordance with an alternating voltage applied to the electro-mechanical energy conversion element.

4. The vibration-type actuator according to claim 1, wherein the supporting guide unit of the second vibration body unit guides the contact body in the direction orthogonal to the predetermined direction in accordance with movement of the second vibration body unit.

5. The vibration-type actuator according to claim 1, wherein the plurality of vibration body units each includes a holding unit configured to hold the vibration body, and
   at least one of the plurality of vibration body units includes a contact body supporting unit, which is provided at the holding unit and is configured to restrict a degree of freedom of the contact body to guide the contact body in the predetermined direction.

6. The vibration-type actuator according to claim 5, wherein the first vibration body unit fixed by the restriction unit includes the contact body supporting unit.

7. The vibration-type actuator according to claim 5, wherein the contact body supporting unit is provided on the holding unit of each of two of the plurality of vibration body units positioned at both ends in the predetermined direction.

8. The vibration-type actuator according to claim 1, wherein the supporting guide unit functions as a linear guide configured to guide the second vibration body unit in a direction in which the vibration body is pressed against the contact body.

9. The vibration-type actuator according to claim 8, wherein the supporting guide unit functions as a rotation guide configured to support the second vibration body unit rotatably about a predetermined axis.

10. The vibration-type actuator according to claim 9, wherein a rotation center of the rotation guide is provided on a plane that is same as a frictional sliding plane on which the vibration body is in contact with the contact body.

11. The vibration-type actuator according to claim 9, wherein a rotation center of the rotation guide is provided on a plane positioned between two frictional sliding planes on which the vibration bodies disposed to face each other are in contact with the contact body.

12. The vibration-type actuator according to claim 1, wherein each of the plurality of vibration body units includes a pressing unit configured to press and contact the vibration body against the contact body and a reaction force receiving unit configured to receive a reaction force of a pressing force applied by the pressing unit.

13. The vibration-type actuator according to claim 12, wherein the reaction force receiving unit is a roller configured to come into contact with the contact body and to be rotatable about a center axis orthogonal to the predetermined direction.

14. The vibration-type actuator according to claim 12,
   wherein in at least one of the plurality of vibration body units, the elastic body includes a protrusion configured to come into contact with the contact body, and
   when an alternating voltage is applied to the electro-mechanical energy conversion element, vibration involving displacement in a direction parallel to a plane, which is to be in contact with the contact body, is excited at a tip of the protrusion.

15. The vibration-type actuator according to claim 14, wherein the reaction force receiving unit is the protrusion.

16. An apparatus comprising: one or more of the vibration-type actuator according to claim 1; and a main body on which the vibration-type actuator is fixed by the restriction unit.

17. The apparatus according to claim 16, wherein the main body includes a contact body supporting unit configured to restrict a degree of freedom of the contact body to guide the contact body in the predetermined direction.

18. The apparatus according to claim 16, wherein a plurality of the vibration-type actuators are arranged on a circumference of a pitch circle having a predetermined diameter as viewed in the predetermined direction.

19. A multi-axis stage unit comprising:
   a fixed portion including a vibration-type actuator, which comprises a plurality of vibration body units each including a vibration body including an elastic body and an electro-mechanical energy conversion element, and comprises a contact body configured to come into contact with a plurality of the vibration bodies; and a stage connected to the contact body, wherein the contact body and the plurality of the vibration bodies relatively move in a predetermined direction, a first vibration body unit, from among the plurality of vibration body units, includes a restriction unit configured to fix the first vibration body unit and restrict a degree of freedom in the predetermined direction, and a second vibration body unit, from among the plurality of vibration body units, includes a supporting guide unit configured to support the second vibration body unit while the second vibration body unit is movable in a direction orthogonal to the predetermined direction.

20. An articulated robot comprising:

a vibration-type actuator, which comprises a plurality of vibration body units each including a vibration body including an elastic body and an electro-mechanical energy conversion element, and comprises a contact body configured to come into contact with a plurality of the vibration bodies, the vibration-type actuator serving as a driving source, wherein the contact body and the plurality of the vibration bodies relatively move in a predetermined direction, a first vibration body unit, from among the plurality of vibration body units, includes a restriction unit configured to fix the first vibration body unit and restrict a degree of freedom in the predetermined direction, and a second vibration body unit, from among the plurality of vibration body units, includes a supporting guide unit configured to support the second vibration body unit while the second vibration body unit is movable in a direction orthogonal to the predetermined direction.

* * * * *